(12) United States Patent
Fujimoto et al.

(10) Patent No.: US 7,013,429 B2
(45) Date of Patent: Mar. 14, 2006

(54) ELECTRONIC MAIL TRANSMISSION/RECEPTION SYSTEM AND ELECTRONIC MAIL TRANSMISSION/RECEPTION PROGRAM

(75) Inventors: Hiroyuki Fujimoto, Nara (JP); Kazumi Sawai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 638 days.

(21) Appl. No.: 10/093,736

(22) Filed: Mar. 11, 2002

(65) Prior Publication Data

US 2002/0138584 A1  Sep. 26, 2002

(30) Foreign Application Priority Data

Mar. 21, 2001 (JP) ............................. 2001-080936
Jan. 30, 2002 (JP) ............................. 2002-020887

(51) Int. Cl.
*G06F 13/00* (2006.01)
(52) U.S. Cl. ...................................... 715/752; 715/751
(58) Field of Classification Search ................ 715/864, 715/751, 765, 763, 764, 752, 744
See application file for complete search history.

(56) References Cited

U.S. PATENT DOCUMENTS 6,496,849 B1 * 12/2002 Hanson et al. ............... 709/200
6,515,681 B1 * 2/2003 Knight ........................ 715/751
6,704,024 B1 * 3/2004 Robotham et al. ........... 345/581

FOREIGN PATENT DOCUMENTS

JP 6-237268 8/1994
JP 10-42215 2/1998

* cited by examiner

*Primary Examiner*—Cao (Kevin) Nguyen
(74) *Attorney, Agent, or Firm*—Birch, Stewart, Kolasch & Birch, LLP

(57) ABSTRACT

In order to enable communication in which information is exchanged with friends and acquaintances, and a plurality of messages can be listed as on a bulletin board without being aware of electronic mail functions, an electronic mail transmission/reception system comprises a communication mean to transmit and receive electronic mail; a display mean to display transmitted and received electronic mail on a display screen; a message input mean to input messages to the display screen; a message storage mean to store input messages; and a control mean to cause the above display means to display input messages in a message-board format. The control mean divides the above display screen into a plurality of message display regions, and associates each message with a message display region for display.

20 Claims, 27 Drawing Sheets

Fig. 4

STORAGE CONTENT IN EXTERNAL STORAGE DEVICE

| Mail No. | Nick name | Address | Message Display Area | Timer Setting | Preset Date | Message Content |
|---|---|---|---|---|---|---|
| 1 | Youko | youko@abc… | 1 | 30 | 000210 10:15 1 | Don't forget the party on the 12th |
| 2 | Keiko | keiko@xyz… | 2 | | | Look for venue for Keiko's B-day party |
| 3 | Kouichi | kouichi@nkk… | 3 | | | Date latest L'Arc-en-Ciel album goes on sale |
| 4 | Miyuki | miyuki@pop… | 4 | | | |

FLOW OF METHOD FOR SETTING MAIL DESTINATION

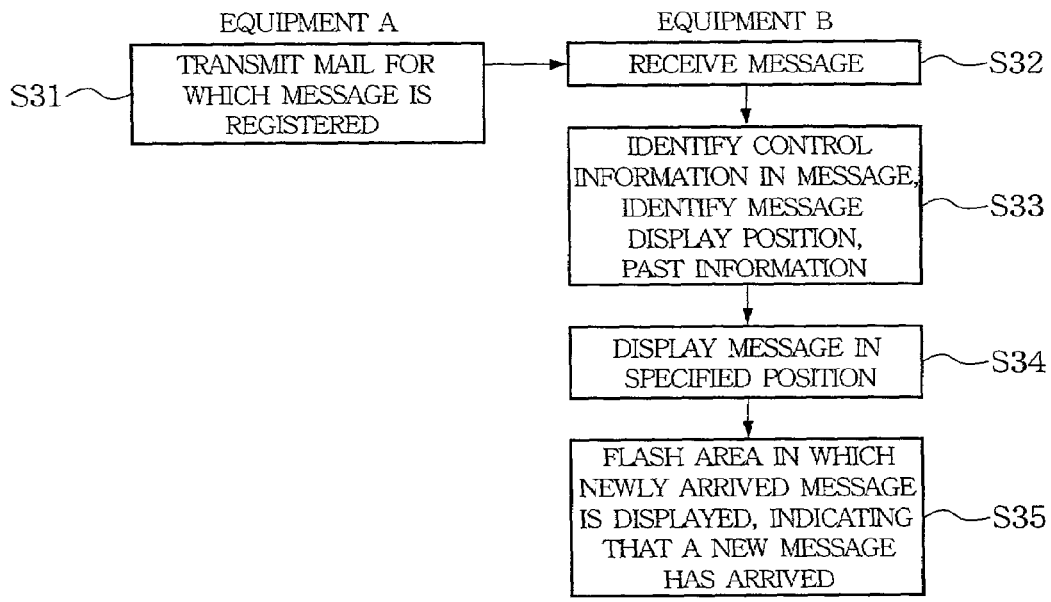
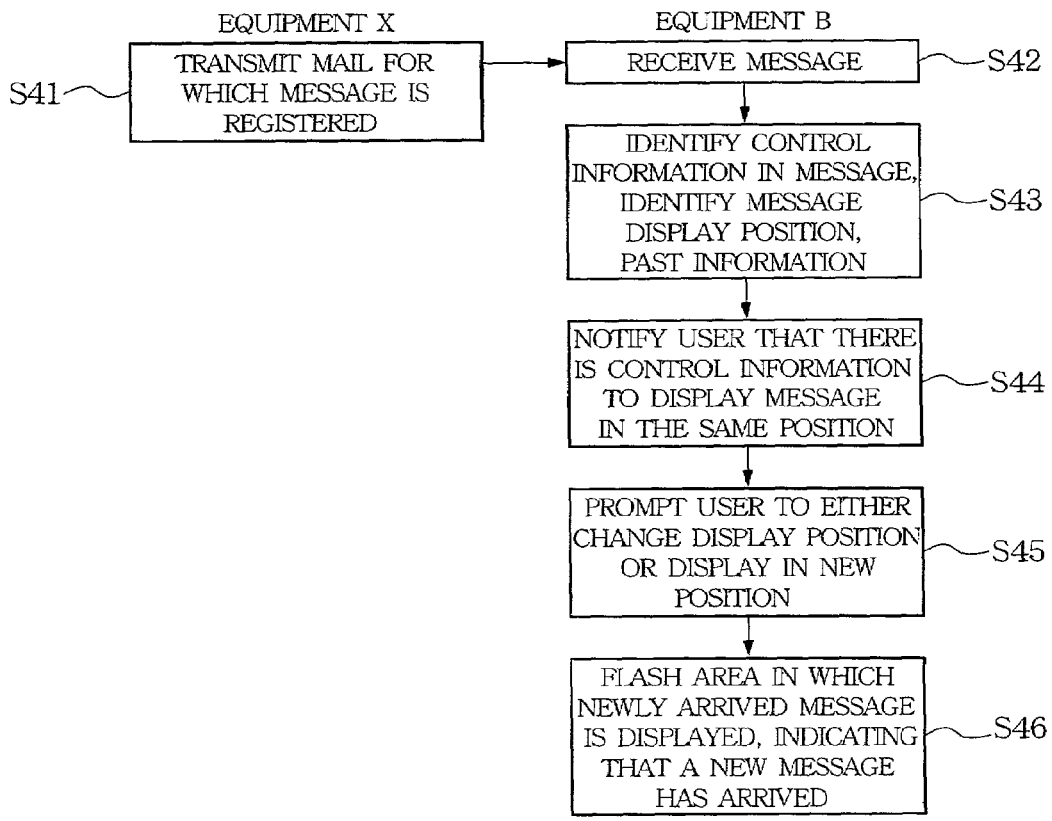

36  PRESET DATE SPECIFICATION KEY

38 PRESET DATE
39 ADVANCE NOTICE SPECIFICATION
37 PRESET DATE SPECIFICATION WINDOW

Fig. 20

| MAIL No. | ADDRESS | DISPLAY PATTERN | DISPLAY REGION | CONNECTED OTHER PARTY | | | DISPLAY PATTERN | DISPLAY REGION | CONNECTION START TIME |
|---|---|---|---|---|---|---|---|---|---|
| | | | | DISPLAY PATTERN | ADDRESS | DISPLAY REGION | | | |
| 1 | ABC@··· | A | PAGE1-1 | A | XYZ@··· | PAGE1-1 | A | 1 | 2001.10.1 10:10 |
| 2 | 123@··· | A | PAGE2-1 | A | XYZ@··· | PAGE2-1 | A | 2 | 2001.10.1 10:15 |
| 3 | 123@··· | A | PAGE1-1 | A | AAA@··· | PAGE1-1 | A | 1 | 2001.10.1 10:20 |
| 4 | 123@··· | A | PAGE3-1 | A | BBB@··· | PAGE3-1 | A | 3 | 2001.10.1 10:25 |
| 5 | 123@··· | A | PAGE4-1 | A | CCC@··· | PAGE4-1 | A | 4 | 2001.10.1 10:30 |
| 6 | 123@··· | A | PAGE1-2 | A | DDD@··· | PAGE1-2 | A | 1 | 2001.10.1 10:35 |
| 7 | 123@··· | A | PAGE2-2 | B | EEE@··· | PAGE2-1 | — | — | 2001.10.1 10:40 |
| 8 | XYZ@··· | A | PAGE3-1 | B | EEE@··· | PAGE3-1 | — | — | 2001.10.1 10:45 |
| 9 | ABC@··· | A | PAGE2-1 | B | EEE@··· | PAGE1-1 | — | — | 2001.10.1 10:50 |

Fig. 21

| MAIL No. | CONNECTED OTHER PARTY | | | DISPLAY PATTERN | DISPLAY REGION | CONNECTION START TIME |
|---|---|---|---|---|---|---|
| | ADDRESS | DISPLAY PATTERN | DISPLAY REGION | | | |
| 1(2) | XYZ@··· | A | PAGE2-1 | A | 2-1 | 2001.10.1 10:15 |
| 2(3) | AAA@··· | A | PAGE1-1 | A | 1-1 | 2001.10.1 10:20 |
| 3(4) | BBB@··· | A | PAGE3-1 | A | 3-1 | 2001.10.1 10:25 |
| 4(5) | CCC@··· | A | PAGE4-1 | A | 4-1 | 2001.10.1 10:30 |
| 5(6) | DDD@··· | A | PAGE1-2 | A | 1-2 | 2001.10.1 10:35 |
| 6(7) | EEE@··· | B | PAGE2-2 | A | 2-2 | 2001.10.1 10:40 |

ELECTRONIC MAIL TRANSMISSION/RECEPTION SYSTEM AND ELECTRONIC MAIL TRANSMISSION/RECEPTION PROGRAM

This application is based on the Japanese patent applications 2001-080936 and 2002-020887, all the contents of which is incorporated in this application by reference.

BACKGROUND OF THE INVENTION

1. Field of the Invention

This invention relates to an electronic mail transmission/reception system and an electronic mail transmission/reception program, and in particular concerns an electronic mail transmission/reception system suitable for the transmission and reception of electronic mail using a portable data or information terminal or similar.

2. Description of the Related Art

Electronic mail transmission/reception systems employing personal computers (hereafter called "PCs") are generally provided through an electronic mail distribution service based on an electronic mail server. The electronic mail server is associated with a communication network, and mediates between transmission-side PCs and reception-side PCs which are also associated with the communication network. In the electronic mail server, the electronic mailboxes of individual subscribers to the electronic mail distribution service are centrally managed.

When sending electronic mail, the sender sends electronic mail to which is attached the address of the destination. The electronic mail is sent to the electronic mail server via the communication network. In the electronic mail server, the contents of the above electronic mail which has been sent are stored in the electronic mailbox with the address in question. When there is a reception request from the recipient having this address, the electronic mail server transmits to the recipient making the reception request the contents of stored electronic mail from the electronic mailbox allocated to the electronic mail service subscriber.

The electronic mail service subscriber displays the sender, subject name, date sent or received, and other information relating to received electronic mail in a list format on, for example, the display screen of a PC, and manages the received electronic mail.

An electronic mail display device and electronic mail processing device, which make more easily recognizable electronic mail matching specific conditions, are disclosed in Japanese Patent Laid-open No. 6-237268 and Japanese Patent Laid-open No. 10-42215. A display format is employed in which mail is classified into categories by means of icons associated with categories, with the object of improving perspicuity on television receivers with low resolution and similar devices.

However, the technology disclosed in the above publications improves the display format in order to enhance the perspicuity of the display of electronic mail which has been sent or received; insofar as this format displays electronic mail in list form, with the contents of one item displayed in detail as necessary, this technology is similar to the prior art.

Moreover, in portable data terminals and other fields, systems exist for the exchange of messages on a one-to-one basis. However, such systems are inconvenient for use in exchanging messages between a plurality of three or more persons.

An object of the present invention is to provide an electronic mail transmission/reception system which can perform communications among a plurality of persons, and in particular among three or more persons.

SUMMARY OF THE INVENTION

The electronic mail transmission/reception system of this invention comprises a communication mean to transmit and receive electronic mail; a display mean to display sent and received electronic mail on a display screen; a message input mean to input messages to the above display screen; a message storage mean to store the above input messages; and a control mean to display, on the above display mean, the above input messages in message-board format. The electronic mail transmission/reception system of this invention is characterized in that the above control means divides the above display screen into a plurality of message display regions, and associates each message with one of the message display regions for display.

An electronic mail transmission/reception system of this invention configured in this way, when used in portable data terminals, personal computers, word processors and other information equipment, can send and receive information in a bulletin board manner, which is visually easier to view than electronic mail, in order to coordinate times for amusements, send invitations to parties, confirm when others will be free, and similar among friends and colleagues.

Further, each of the above message display regions has an other-party specified region which specifies the other party sending the message, and comprises a specification mean for specifying another party from one or a plurality of other parties set in the above other-party specified region. The above control mean performs control to transmit the message displayed in the above message display region to the other party specified by the above specified means, and in this way, by a single operation on the other party (specified region), the displayed message information can be transmitted and received as electronic mail.

Display position information is attached to electronic mail which has been sent, indicating in which message display region the message had been displayed; the above control mean displays a received message in the message display region in question, based on the above display position information attached to the received message, and in this way a transmitted message can be displayed in the message display region at the same display position as the message display region on the transmitting side. By sharing a specified region within the display screen, the other-party information and message information of a plurality of electronic mails can be shared.

Preferably, when a message displayed in the above message display region is appended or modified, the above control mean performs control to transmit, to the other party specified by the above specification mean, the appended or modified message as well as display position information in order to display the message in the above message display region. By this means, if message information displayed on the display screen is appended or modified, the message information is also appended or modified at a plurality of other parties communicating by electronic mail, and message information can be shared.

Preferably, when a message arrives from another party, the above control mean performs control to display the received message in the above message display region, and to change the display state of the message display region; by this means, the fact of arrival of a message can be easily ascertained, and response to the appending or modification of the message can be performed promptly.

If an electronic mail message which has been sent and received has attached time information for use in performing message transmission at a time set in advance, at the above preset time, the above control mean can transmit the message displayed in the above message display region to the other party specified by the above specification mean, based on the above time information; by this mean, a preset data can be set in the message information, and the message information can be sent to the node's own address at an arbitrary date before the preset date.

In another aspect of this invention, computer-readable recording media is provided, characterized in having recorded a program, which causes a computer to execute an electronic mail transmission/reception system, comprising communication mean to transmit and/or receive electronic mail; a display mean to display transmitted and received electronic mail on a display screen; a message input mean for input of messages to the above display screen; a message storage mean to store messages input as above; and a control mean to cause the above display mean to display the above input messages in a message-board format; wherein the above control mean divides the above display screen into a plurality of message display regions, and each message is associated with and displayed in a message display region.

In addition, a program is provided which causes a computer to execute an electronic mail transmission/reception system, comprising communication mean to transmit and/or receive electronic mail; a display mean to display transmitted and received electronic mail on a display screen; a message input mean to input messages to the above display screen; a message storage mean to store the above input messages; and a control mean to cause the above display mean to display the above input messages in message-board format; and in which the above control mean divides the above display screen into a plurality of message display regions, and associates each message with a message display region for display.

In addition, an electronic mail transmission/reception system is provided, having a communication mean to transmit and receive data, including electronic mail; a display mean, having a display screen; message input mean, to input messages to be displayed on the above display screen; a storage mean, to associate the data of the above input messages with data of the above transmitted and received electronic mail; a display region division mean, which divides the above display screen into a plurality of message display regions; and a control mean, which displays the data of the above electronic mail, stored in the above storage mean and associated, and the data of the above message, in the above respective message display regions, and which causes the above communication mean to perform transmission and reception in response to prescribed user operations.

By means of the above system, data of the above associated electronic mail and data of the above messages are displayed in the divided message display regions, and transmission and reception of these can be performed appropriately in response to prescribed user operations.

Further, it is preferable that the system further comprise an other-party setting mean to set the other party corresponding to the above divided message display regions, and that the data of the above electronic mail and the data of the above messages be associated by another party, set by the above other-party setting mean. By means of this system, the correspondence relation of electronic mail data and message data to other parties becomes evident.

When a received message is displayed in the above message display regions based on attached display position information, if the above message display region in which the message is to be displayed is already in use, it is preferable that the above control mean switch the display screen, giving priority to the display position of the above message display region, and display the above received message in the above message display region. By giving priority to the display position of the message display region, the message can be displayed in a display region based on the display position information attached to the received message. If the display region is already in use, the message can be displayed on the next page of the same display region.

It is preferable that the above prescribed user operation be an operation to start an electronic mail session. The operation to start an electronic mail session is generally the operation performed most frequently by the user, and is also the first operation; if electronic mail communication is subsequently performed, the user can immediately after startup view the most recent version of the message board.

It is preferable that the above input messages be associated with the above message display regions, based on the other party set by the above other-party setting means. By this means, the other party to which messages are sent, and from which messages are received, is easily understood.

It is preferable that the above storage means comprise a storage region, which, when the previous electronic mail session ends, associates and stores the above message display regions and the data contents displayed in the message regions.

It is preferable that the system further comprise other-party setting content storage means, to store the other party corresponding to the above message display regions when the previous electronic mail session ends, and that, when an electronic mail session is started, messages which had been stored in the above storage region, and which had been displayed in the above respective message display regions based on the other party of the above message display regions being used at the time the previous session ended, be redisplayed. By this means, after performing a series of processing from start to end of an electronic mail session, when performing the next electronic mail processing, the next message can be created while referencing processes up to the previous session.

It is preferable that the system have an electronic mail server, which is an electronic mail server on the network, and which has management means for unified management of information indicating in which of the above message display regions the above transmitted electronic mail has been displayed.

In addition, computer-readable recording media is provided on which is recorded a program which causes a computer to execute a procedure to transmit and/or receive data, including electronic mail; a procedure to input messages; a storage procedure to associate and store the data of the above sent and received electronic mail, and the data of the above messages; a procedure to divide a display screen into a plurality of message display regions; and a procedure to display, in the above message display regions, the data of the above electronic mail and the data of the above messages, which have been associated and stored by the above storage mean, and which causes the communication mean to transmit and receive according to prescribed user operations.

Also, a program is provided which causes a computer to execute a procedure to transmit and receive data, including electronic mail; a procedure to input messages; a storage procedure to associate and store the data of the above sent and received electronic mail, and the data of the above messages; a procedure to divide display screen into a plurality of message display regions; and a procedure to display, in the above message display regions, the data of the above electronic mail and the data of the above messages, which have been associated and stored by storage mean, and which causes the communication mean to transmit and receive according to prescribed user operations.

Each of the configurations of the above means of resolution can be combined freely for use.

BRIEF DESCRIPTION OF THE DRAWINGS

FIG. 4 is a figure showing one example of the stored content which is registered in the external storage device of this aspect;

FIG. 12 is a flowchart showing the operation for sharing a particular region of the display screen of the electronic mail transmission/reception system of this aspect;

FIG. 13 is a flowchart showing the operation for a case in which electronic mail arrives, such that a message is displayed in the same position, from equipment X, other than the equipment A, B of the electronic mail transmission/reception system of this aspect;

FIG. 20 is an example of the data configuration in a connection management data storage unit 102 which performs data management in the mail server 101 during connection;

FIG. 21 is a figure showing the data configuration of a connection other-party management data storage unit, which manages other parties during connection to this mail transmission/reception system and transmission/reception of mail;

DESCRIPTION OF THE PREFERRED EMBODIMENTS

Before explaining aspects of this invention, deliberations by the inventor are first described.

Even before the invention of electronic mail transmission/reception systems, communication among a plurality of persons was quite common in regional communities, companies, and schools, by means of bulletin boards, circular notices, and the like. When such methods are used, communication among a plurality of persons is possible. However, in the case of a bulletin board, each person must go to the place where the bulletin board is posted. And in the case of a circular notice, it was necessary to wait until the circular notice arrived. Also, it was difficult to reflect individual schedules in the information all at one time.

It would therefore be convenient to be able to immediately share with one's friends and acquaintances information to adjust meeting times and meeting places, invitations to parties, the times when others are free, and similar information.

The inventor thought of a format for an electronic bulletin board as described below, as an electronic bulletin board enabling the listing of a plurality of messages so as to enable information exchange among friends and acquaintances, without the need to be concerned with electronic mail functions. For example, suppose that the address and other information for another party, with whom one exchanges information by electronic mail, can be set in a display region divided such that the messages of a plurality of persons can be listed. When performing transmission and reception of electronic mail, for example, a screen for one's own messages, and a screen for the messages of other parties, set in advance, are displayed. In this way, operations to input the address and other information of another party whom one is contacting, or with whom one is making arrangements, can be omitted. This is also convenient in the case of an electronic conference in which the participants are determined in advance.

At this time, message contents up until the previous session and similar can be saved in association with the display region. It is also possible to append new content to the saved message content, and in addition the content can be newly updated and displayed.

Based on the above deliberations, the electronic mail transmission/reception system of a first aspect of this invention is explained below, referring to FIG. 1 through FIG. 12.

Figure 1:
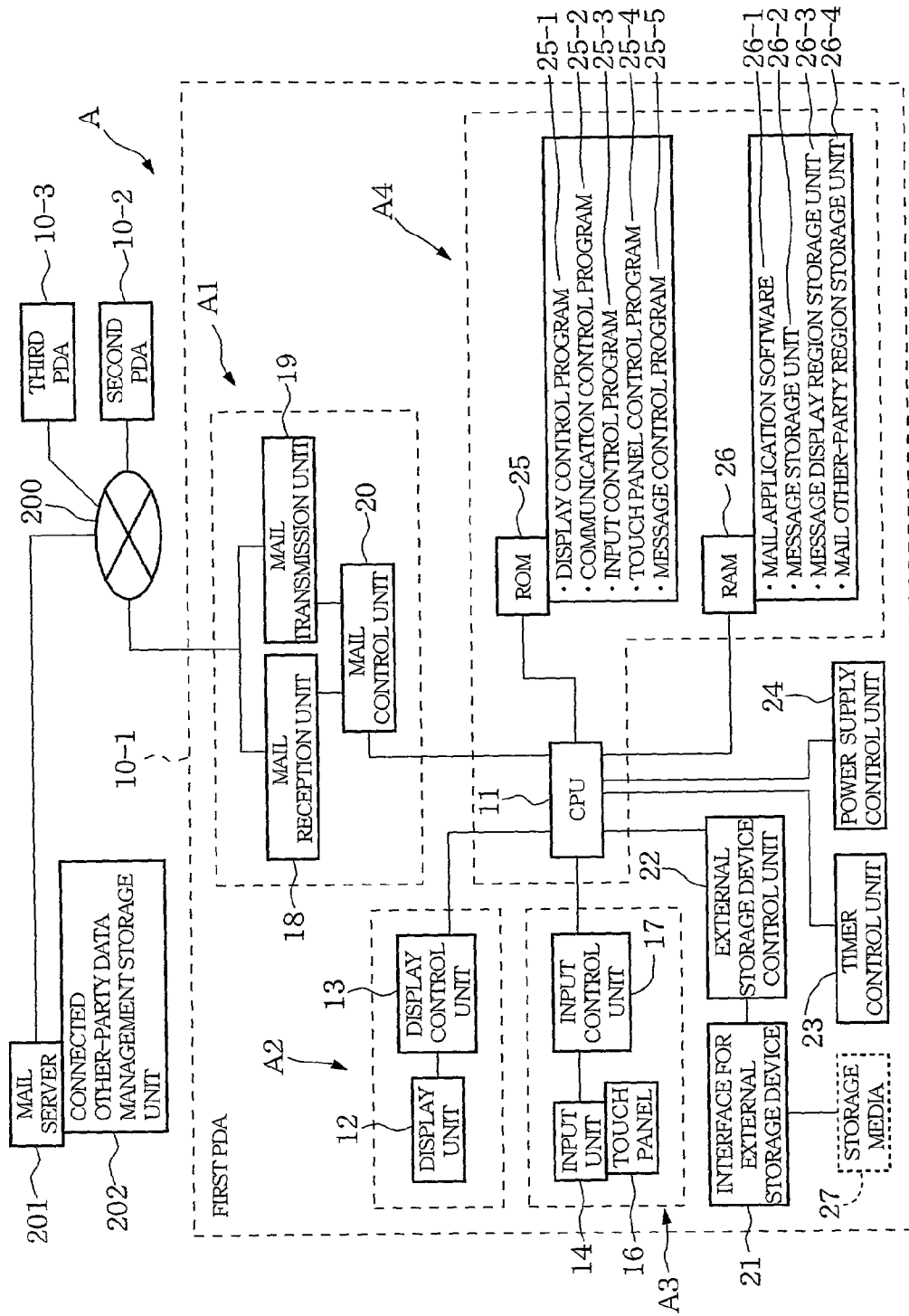
FIG. 1 is a block diagram showing the configuration of the electronic mail transmission/reception system of a first aspect of this invention.

FIG. 1 is a functional block diagram showing the configuration of the electronic mail transmission/reception system of the first aspect of this invention. The system in question can be applied in portable data terminals, in PCs and word processors, and in any other kind of information equipment. In this aspect, PDAs (Personal Digital Assistants) are employed as examples of portable data terminals.

As shown in FIG. 1, the electronic mail transmission/reception system A of the first aspect of this invention has a plurality of PDAs 10, such as for example a first, PDA 10-1, second PDA 10-2, and third PDA 10-3; a communication network 200; and a mail server 201. The plurality of PDAs 10 and the mail server 201 are associated to the communication network 200.

In order to perform electronic mail communication, these PDAs 10 use telephone lines or similar to connected to the Internet or another network 200, to perform transmission and reception of electronic mail with another electronic mail party. The network 200 has a mail server 201 which manages the electronic mail system. In the mail server 201 is provided a connection other-party data management storage unit 202 which manages other parties exchanging electronic mail while connected.

The configuration of these PDAs 10 is explained, taking the first PDA 10-1 as an example. The first PDA 10-1 has electronic mail transmission/reception means A1, display means A2, input means A3, and control means A4.

The electronic mail transmission/reception means A1 has a mail reception unit 18, mail transmission unit 19, and mail control unit 20. The mail reception unit (communication means) 18 receives electronic mail. The mail transmission unit (communication means) 19 transmits electronic mail. The mail control unit 20 controls the mail reception unit 18 and mail transmission unit 19.

The display means A2 has a display unit 12 and display control unit 13. The display unit 12 has, for example, a liquid crystal display device and various drivers. This may also be connected to a touch panel 16 enabling input by touching the display screen of the liquid crystal display device. The touch panel 16 is discussed below.

The input means A3 has an input unit 14, a touch panel 16, and an input control unit 17. The input unit 14 comprises a keyboard, having input key groups such as alphanumeric keys to perform input of various settings and cursor movement keys (message input means and a portion of the specification means); a mouse; and a stylus pen. In cases where a touch panel 16 enabling touch input is provided, it is convenient to use a stylus pen. The input control unit 17 controls the input unit 14. In cases where a touch panel 16 is provided, the touch panel 16 is also controlled.

The control means A4 is configured to comprise a central processing unit (CPU: control means) 11, ROM (read-only memory) 25, and RAM (random access memory) 26.

The CPU 11 unifies and controls the various control units. The CPU 11 is connected to, for example, the display control unit 13, input control unit 17, mail control unit 20, external storage device control unit 22, timer control unit 23, power supply control unit 24, ROM 25, and RAM 26, and unifies and controls each of the above units.

Further, the PDA 10-1 has an external storage device interface 21 and an external storage device control unit 22.

The external storage device interface 21 is capable of data exchange with storage media 27 employing, for example, non-volatile memory or similar. The external storage device control unit 22 exercises control such that data exchange is possible between the external storage device interface 21 and the storage media 27.

The storage media 27 has for example a backup power supply; an SRAM card which holds written information, a compact flash (CF) card using ROM (flash memory or similar) not requiring a power supply, any kind of memory cards can be used.

In the case of information equipment larger than a PDA 10, such as for example a notebook-type PC (personal computer), in place of the storage media 27, a hard disk drive (HDD), floppy disk drive (FDD), or other storage device is commonly used.

The external storage device control unit 22 performs control to store electronic mail sent and received in the mail control unit 20, and to back up data by storing data generated in the processing of message board and other applications and management items to storage media 27 employing flash memory or similar. In place of the storage media 27, a hard disk drive or other external storage device may be used.

The timer control unit 23 performs time control. More specifically, it is started automatically at a time set by the message board or other application, and manages the automatic reception of electronic mail via the mail control unit 20 and screen control to, for example, prevent a screen from being displayed on timer startup.

The power supply control unit 24 converts power from a battery pack, such as for example a lithium ion battery, to the power supply voltage and supplies the same to each of the units of the PDA 10-1 in casesi where the PDA (personal digital assistant) 10 cannot use a commercial power supply, such as for example when outdoors.

The ROM 25 stores control programs related to the PDA 10, such as a display control program 25-1 to control display by the display unit 12; a communication control program 25-2 to perform communication over telephone lines; an input control program 25-3 to control the input of the input unit (keyboard, stylus pen and similar) 14, touch panel 16, or other devices; touch panel control program 25-4 to control the touch panel 16; and message control program 25-5 to control electronic mail and other messages.

The RAM 26 is a high-speed storage device, provided to store data temporarily when performing various processing, and comprises an electronic mail application software (storage unit) 26-1, storing one type of application software; message storage unit 26-2, to store the contents of electronic mail messages; message display region storage unit 26-3, to store the positions of display regions at which messages are displayed; and mail other-party storage region 26-4, to store information on the other parties of messages. The message storage unit 26-2 can also store message histories.

Message contents, display region positions, mail other-party information and similar is normally held in RAM 26. For example, in ordinary PDAs, in addition to the dry cell or lithium ion battery used as the main power supply, a backup battery (button-type battery or similar) is also provided to maintain data stored in RAM 26.

In the unlikely event that the above backup battery is consumed, if the user forgets to replace the backup battery, the data stored in RAM 26 will be lost. By performing periodic backups to compact flash or other storage media 27 of the data in RAM 26, if the data stored in RAM 26 is lost, it can be easily and conveniently restored. If the RAM data storage capacity is small, it is also possible to store at least a portion of the data, from the mail application software 26-1 to the mail other-party region storage unit 26-4, on the storage media 27 temporarily. If the PDA or similar incorporates a hard disk, the above data may also be stored on the hard disk.

Below, the operation of an electronic mail transmission/reception system configured as described above is explained.

Figure 2:
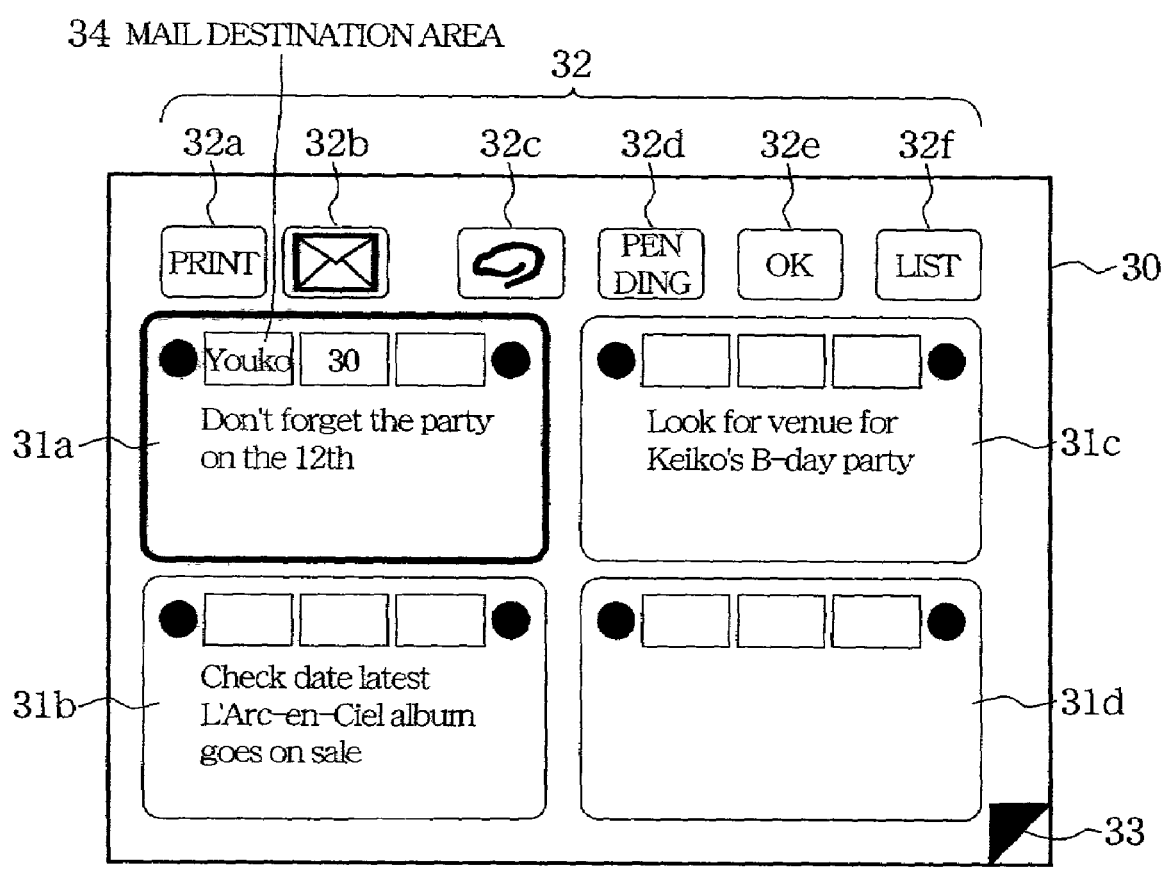
FIG. 2 is a figure showing an example of the screen of an application message board of the electronic mail transmission/reception system of this aspect.

FIG. 2 shows the application message board of this electronic mail transmission/reception system, comprising a plurality of (here, four) message display areas 31a to 31d (message display regions); software keys 32 including a print button 32a, an electronic mail button 32b, a draw button 32c, a pending button 32d, an OK button 32e, and a list button 32f; and a page-turning key 33. The message display areas 31a to 31d comprise a mail destination area 34 (other-party specification region) in the upper portion of the area; the display frame of a selected message display area is displayed by a thick line, indicating that the display area is in the active state. In FIG. 2, the message display area 31a is in the active state.

The software keys 32 and the message display areas 31 displayed as a result of specification by the electronic mail button 32b of the application message board 30 can receive input and by specified through the input unit (keyboard) 14 or through touch input by the touch panel 16. When the information equipment is a portable data terminal PDA 10, input to/specification of the software keys 32 and message display areas 31 are often primarily through touch input to the screen. Of course, input may also be performed via a keyboard, either externally connected or built-in.

Figure 3:
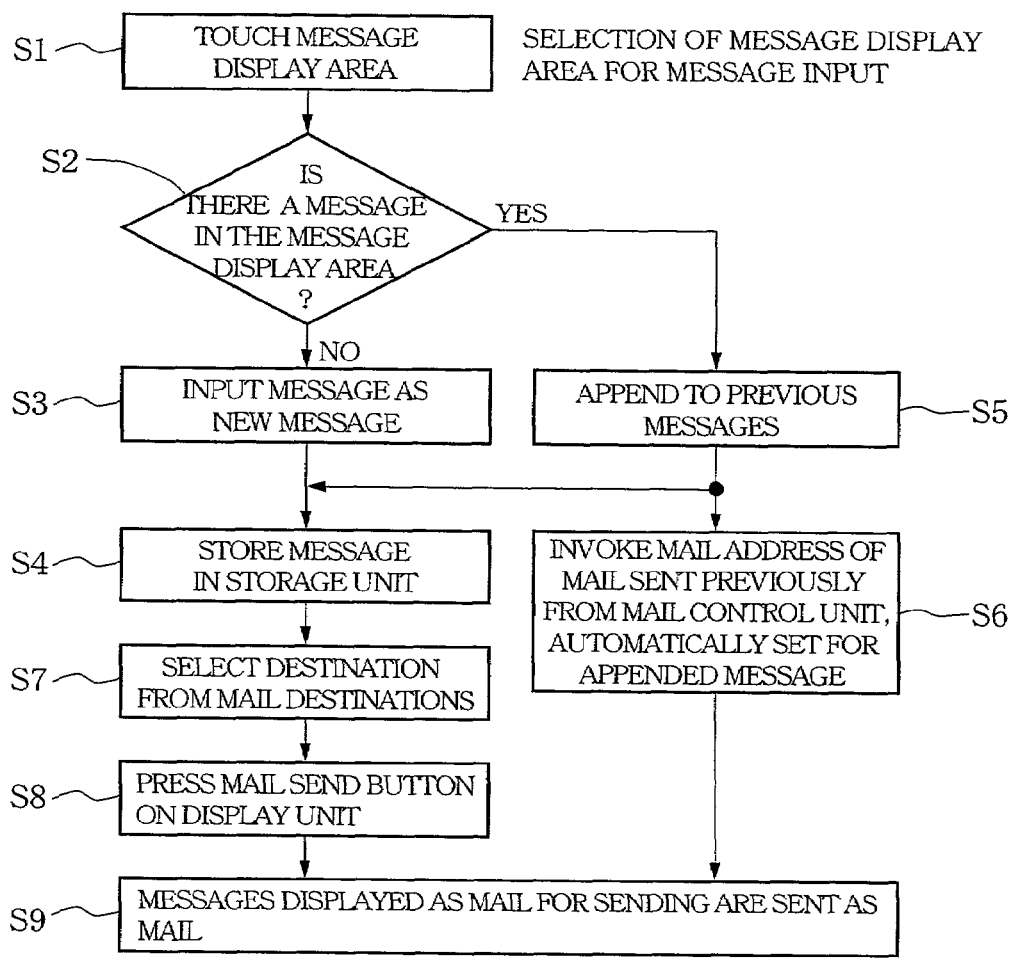
FIG. 3 is a flowchart showing the flow until a message is input to the message display area and electronic mail is sent, in the electronic mail transmission/reception system of this aspect.

FIG. 3 is a flowchart showing the flow until a message is input to the message display area and electronic mail is sent, and indicates the flow of message input operations and of registered information. In the figure, S denotes the various steps in the processing flow.

First, in step S1 the message display area 31 (FIG. 2) for input of a message is selected by touching the screen. In step S2, discrimination as to whether a message exists in the selected message display area is performed. If there is no message in the message display area, this operation is judged to be input of a new message. In step S3, a memo, reminder, or other message is input to the message display area. In step S4, when message input or appending is ended, the input message content is stored in, for example, the message storage unit 26-2 (FIG. 1) in RAM 26. As described above, the data may also be stored in storage media 27 (FIG. 1) or on a hard disk or other external storage device.

Next, in step S7 the electronic mail destination for this mail is selected from an electronic mail destination database.

In step S8, the destination for this message is specified, and the electronic mail key 30b (FIG. 2) for the message board 30 (FIG. 2), which is the electronic mail transmit button, is pressed.

On the other hand, if in the above step S2 there is a message in the message display area, it is judged to be a message input in the previous session, and in step S5 the previous message is read and displayed, and a new message is input, in the form of appending to the previous message.

Next, in step S6 the electronic mail address to which the message was previously sent is invoked from the mail control unit 20, and the electronic mail address of the appended message is automatically set to that of the invoked message before proceeding to step S9. In step S9, electronic mail transmission processing is performed. That is, the message displayed in the display area and similar is transmitted as electronic mail.

Through the above processing, the contents of memos, reminders, and other messages are stored, and electronic mail containing messages can be transmitted. If there is already a history of message exchanges, this is appended to previous messages. If there is no history of message exchanges, the message can be input or appended as a new message.

When message input and appending is completed, the input display area position and message are stored in RAM 26, for example in the message storage unit 26-2, message display region storage unit 26-3, and similar. The information may also be stored in an external storage device (storage media 27). When there is a transmission history, the transmitted electronic mail address is invoked from the mail control unit 20, and a composite message to which the new message is added is automatically formed. The composite message is automatically transmitted to the electronic mail address remaining in the history.

At this time, the transmitted message is automatically transmitted to another party having an electronic mail address with a prescribed timing, as a message entered in the message display area in question.

Figure 5:
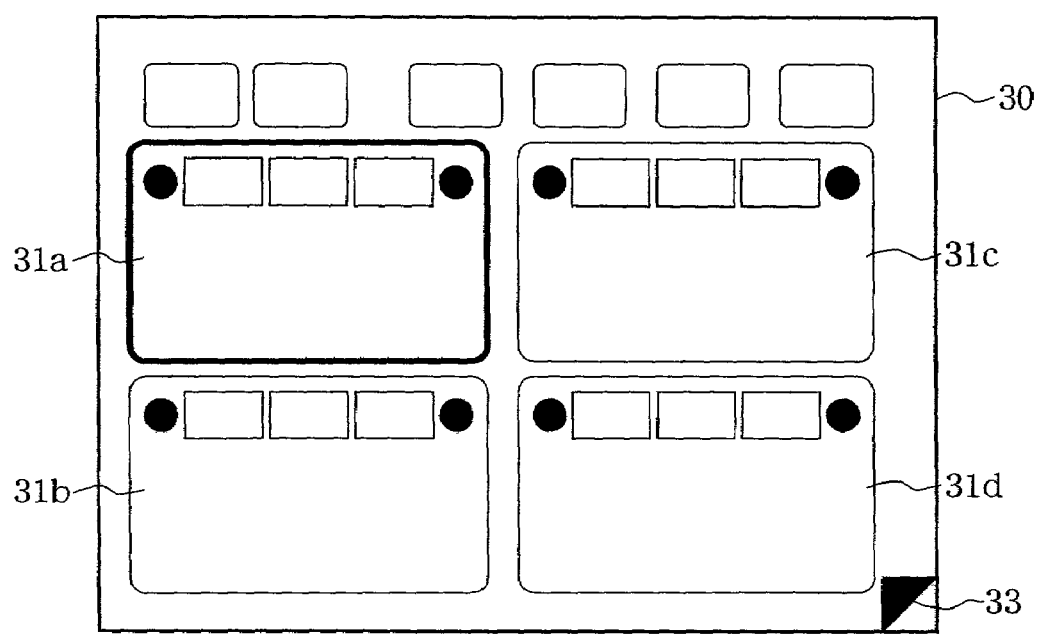
FIG. 5 is a figure showing the relation between the stored contents and the message display area of the electronic mail transmission/reception system of this aspect.

FIG. 4 is a figure showing one example of the stored content which is registered in an external storage device 27 or in RAM 26. FIG. 5 is a figure showing the relation between the above stored contents and the message display area.

As shown in FIG. 4, the stored contents of the electronic mail number, the nickname and other information for the corresponding other party, the address (electronic mail address), the message display area, the timer setting, the preset date setting, and the message contents are registered (stored) in RAM 26 or the storage media 27. The message display area numbers "1", "2", "3", "4" correspond to the message display areas 31a to 31d shown in FIG. 5.

Information such as the input message content and the message display area position is registered in RAM 26 or in the storage media 27. The message exchange history is similarly stored in RAM 26 or in the storage media 27.

As shown in FIG. 5, the message display areas 31a to 31d are displayed based on the message display area numbers (FIG. 4) registered in the message display region storage unit 26-3 of RAM 26 or in the storage media 27 (FIG. 1). Of course, the other PDAs 10-2 or 10-3 for transmission and reception in this electronic mail system have similar configurations.

Hence messages and other information is managed similarly. It is preferable that, when display areas have the same number, display in the same display area of a different page be possible by pressing the page-turning key 33.

By this means, applications for memos, reminders and similar, which are adopted in portable data terminals (PDAs) 10, are merged with electronic mail functions, and can be handled within a single application software.

In other words, it becomes possible to handle electronic mail like memos, and to convey the contents of a memo, unmodified, to friends, family, and others.

Only the minimum necessary functions were displayed on the screen of the portable data terminal (PDA) used in the electronic mail transmission/reception system of this aspect, but by inserting markers and similar in the message display areas 31, functions may be added to, for example, attach symbols to exchanged messages, assign priorities, or urge the other party to exercise caution.

In order to realize this electronic mail transmission/reception system, conditions include the necessary conditions for connection to a provider required for electronic mail transmission/reception, and the setting in advance, in the mail control unit 20, of the electronic mail server specification.

As explained above, when the electronic mail transmission/reception system of this aspect is used, reminders, memos, and messages to family and friends, which have been posted to the message board, can be exchanged. Information can be exchanged with friends and acquaintances without being conscious of electronic mail functions.

For example, information which must not be forgotten, brief messages, and ideas one has hit upon can be posted to the message board, and memos and messages which have been pasted to the message board can be sent periodically to acquaintances using electronic mail functions. Similar messages are displayed on the message boards of other parties which have been received, so that in contrast with simple electronic mail functions, a plurality of messages can be listed. Hence information can be exchanged as if a plurality of persons is communicating in person.

Next, the electronic mail transmission/reception system of a second aspect of this invention is explained. The configuration of the information equipment used in the electronic mail transmission/reception system of this aspect is similar to the configuration shown in FIG. 1.

Figure 6:
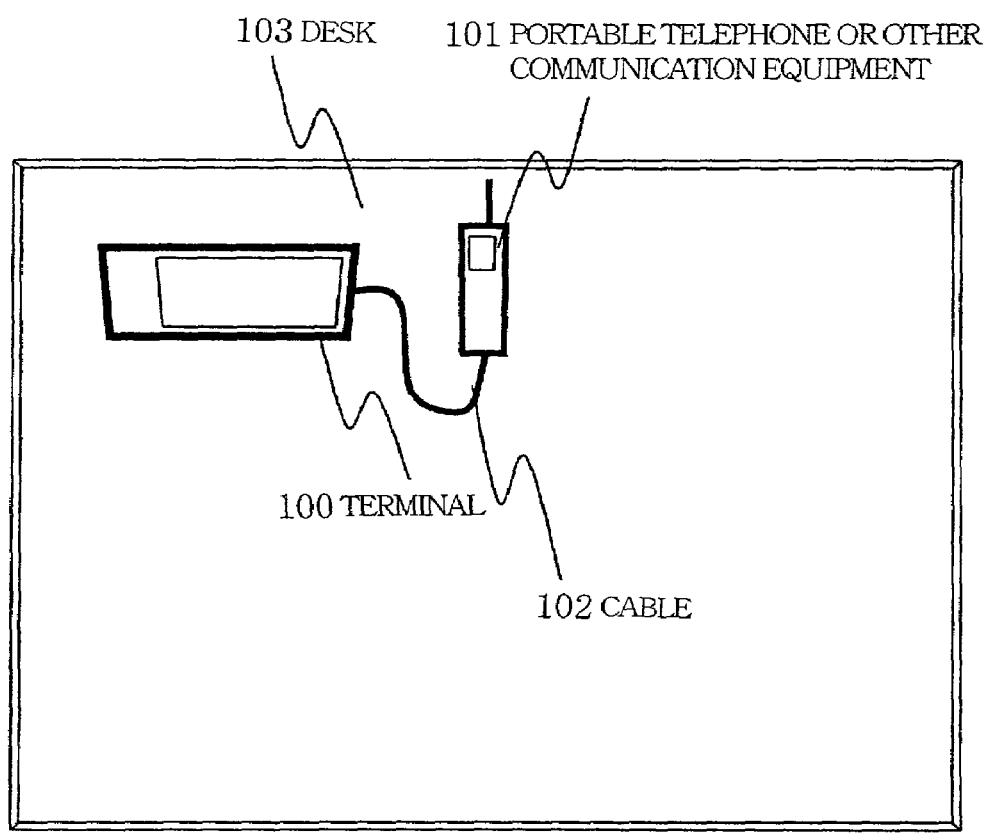
FIG. 6 is a figure showing one example of equipment connection in order to realize the electronic mail transmission/reception system of a second aspect of this invention.

FIG. 6 is a figure showing one example of equipment connection in order to realize the electronic mail transmission/reception system of this aspect.

As shown in FIG. 6, when connecting equipment necessary to, for example, capture messages, the PDA (terminal device) 100 which is the information equipment is connected to a portable telephone 101 or other communication equipment via a portable telephone connection cable 102. If this equipment 100, 101 is placed on a desk 103, message exchange can be performed automatically, with the sensation of writing on stationery, even while working or studying. In place of the portable telephone 101, a wireless communication terminal to which the terminal device 100 can be connected and disconnected without a cable may be used, or a PDA (terminal device) with internal wireless communication terminal may be used.

Figure 7A:
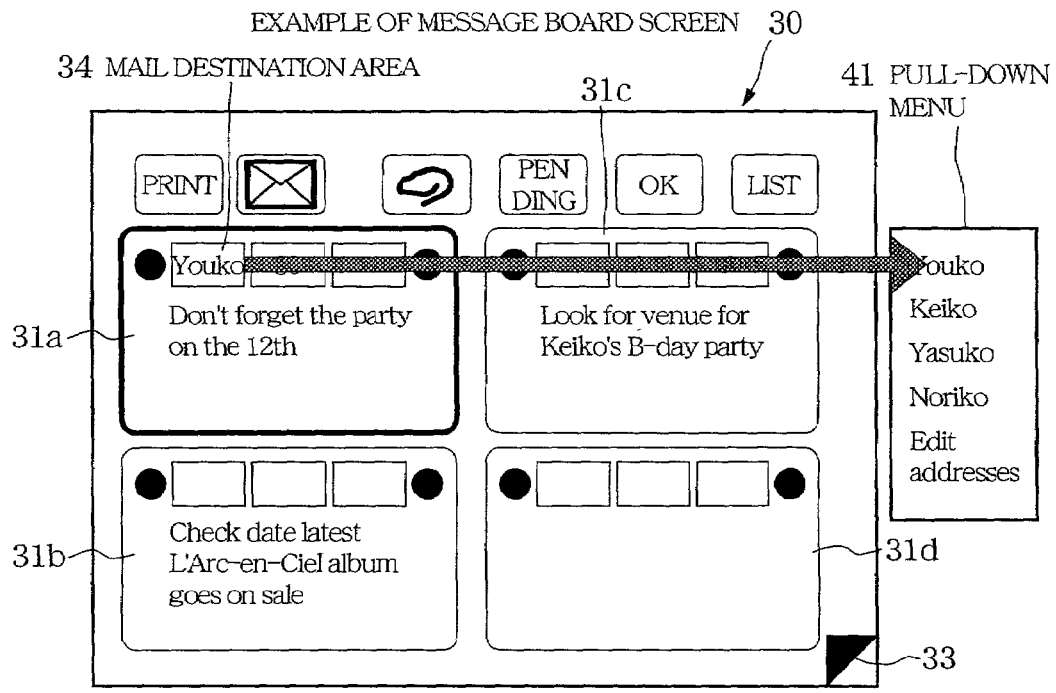
FIG. 7A and FIG. 7B are figures showing examples of the screen of an application message board of the electronic mail transmission/reception system of this aspect.

Below, the operation of an electronic mail transmission/reception system configured as described above is explained. FIG. 7 is a figure showing examples of the screen of an application message board of this electronic mail transmission/reception system. FIG. 7A is an example of a display screen relating to the method of selection of a destination, and FIG. 7B is an example of a display screen relating to timer transmission/reception.

As shown in FIG. 7A, the message board 30 has mail destination areas 34 in addition to the message display areas.

The mail destination areas 34 display a pull-down menu 41 (a portion of destination setting means) upon, for example, using a stylus pen to touch the area. The pull-down menu 41 displays electronic mail addresses already registered in the mail control unit 20 (FIG. 1). Nicknames for other parties may for example be displayed to correspond to electronic mail addresses. For example, the pull-down menu 41 can be used to select a nickname, and by this means easily select a message destination.

Figure 7B:
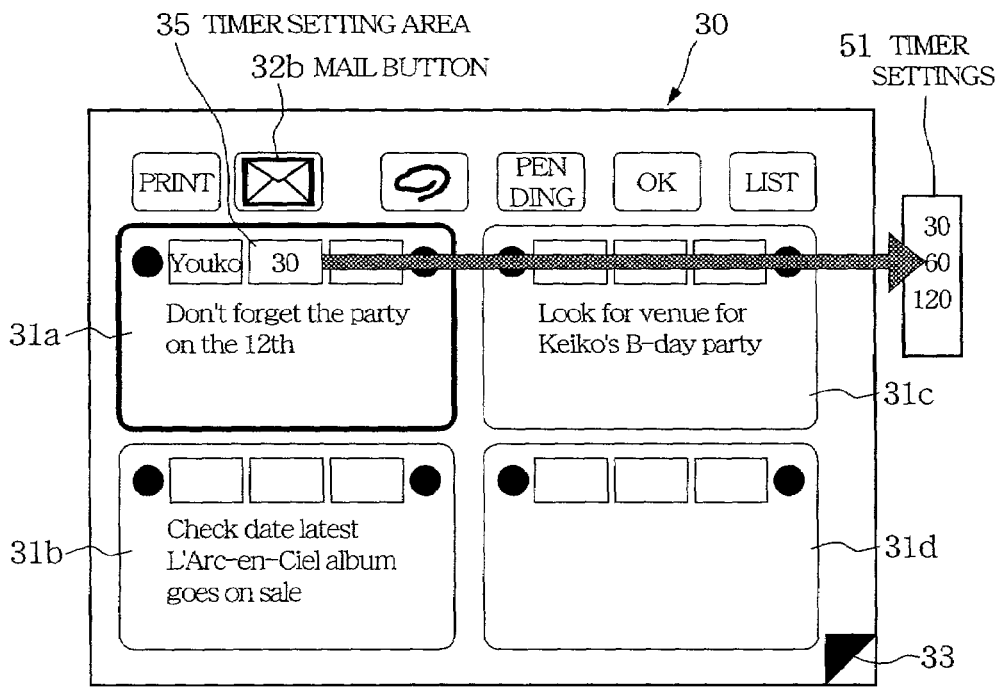

As shown in FIG. 7B, in addition to message display areas, a timer setting area 35 may also be provided. The timer setting area 35 displays, in a pull-down menu 51, a list of timer settings when touched with, for example, a stylus pen. Timer settings of, for example, every 30 minutes, every 60 minutes, every 120 minutes, and every day, can be selected. Electronic mail transmission and reception processing can be automatically performed at each interval of the selected time.

Figure 8:
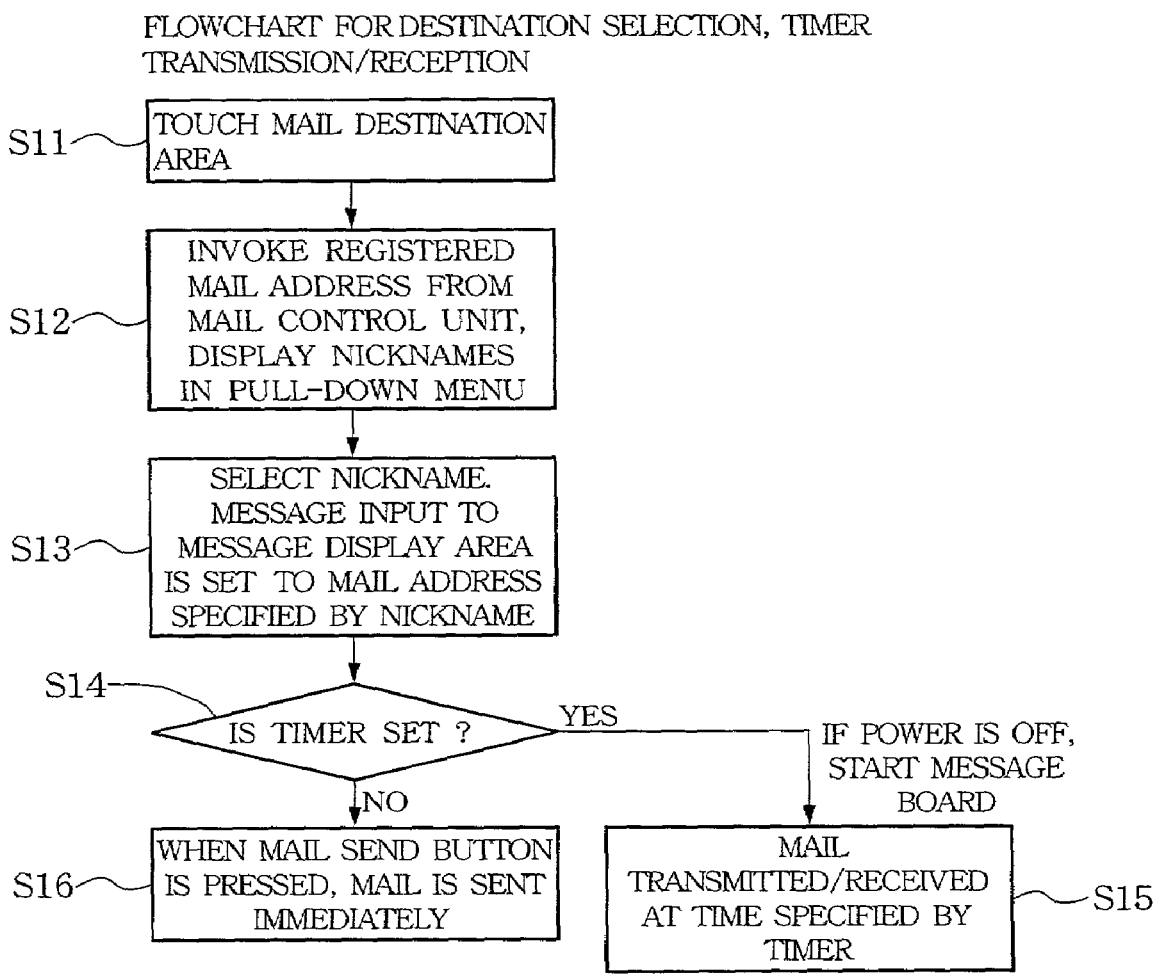
FIG. 8 is a flowchart showing the flow of selection of the destination and timer transmission and reception of the electronic mail transmission/reception system of this aspect.

FIG. 8 is a flowchart showing the flow of selection of the destination and timer transmission and reception, in order to realize the various functions of FIG. 7A and FIG. 7B.

First, in step S11 by touching the electronic mail destination area 34, the pull-down menu 41 (FIG. 7) is displayed. In step S12, electronic mail addresses registered in the mail control unit 20 (FIG. 1) are invoked, and the nicknames registered therein are displayed in the pull-down menu 41. In FIG. 7A, the nicknames registered in the mail control unit 20 "Yoko", "Keiko", "Yasuko" and "Noriko", as well as "Edit addresses", are displayed in the pull-down menu.

In step S13, a nickname is selected from the pull-down menu 41. By this means, a message display area and an electronic mail address specified by a nickname can be associated. That is, an electronic mail address can be allocated to a message display area.

When transmitting electronic mail using ordinary electronic mail software, first a key is pressed to select an "address" or other menu. A list of addresses is displayed, and one address is selected from among them. When using the information equipment of this aspect, a nickname or other means of specifying the other part with whom messages are exchanged, and the messages, are displayed in the same message display area, so that it is easily understood with whom messages are being exchanged.

By changing the electronic mail destination of the mail destination area 34, the destination for messages can be modified. A plurality of persons, rather than a single person, can be designated for transmission. That is, by classifying destinations into groups, messages can be transmitted to a plurality of other parties.

Next, timer setting functions are explained. In step S14, discrimination as to whether the timer has been specified is performed. If the timer has been specified, in step S15 messages are transmitted and received at the specified timer setting time. It is also possible to have messages transmitted and received at the timer setting time when the power supply is turned off, by starting the message board functions.

For example, as shown in FIG. 7A and FIG. 7B, when the timer setting area 51 is touched the timer settings are displayed in the pull-down menu 51, and a setting of every 30 minutes, every 60 minutes, every 120 minutes, every day, and so on, can be selected.

By selecting this timer setting, when acquiring electronic mail, information is obtained from the electronic mail server, not shown, even if the PDA is not turned on and electronic mail capture is not performed; new messages are received, and messages are updated.

If the timer has not been specified in step S14, in step S16 pressing the electronic mail button 32b (FIG. 2) causes electronic mail to be transmitted.

Figure 9:
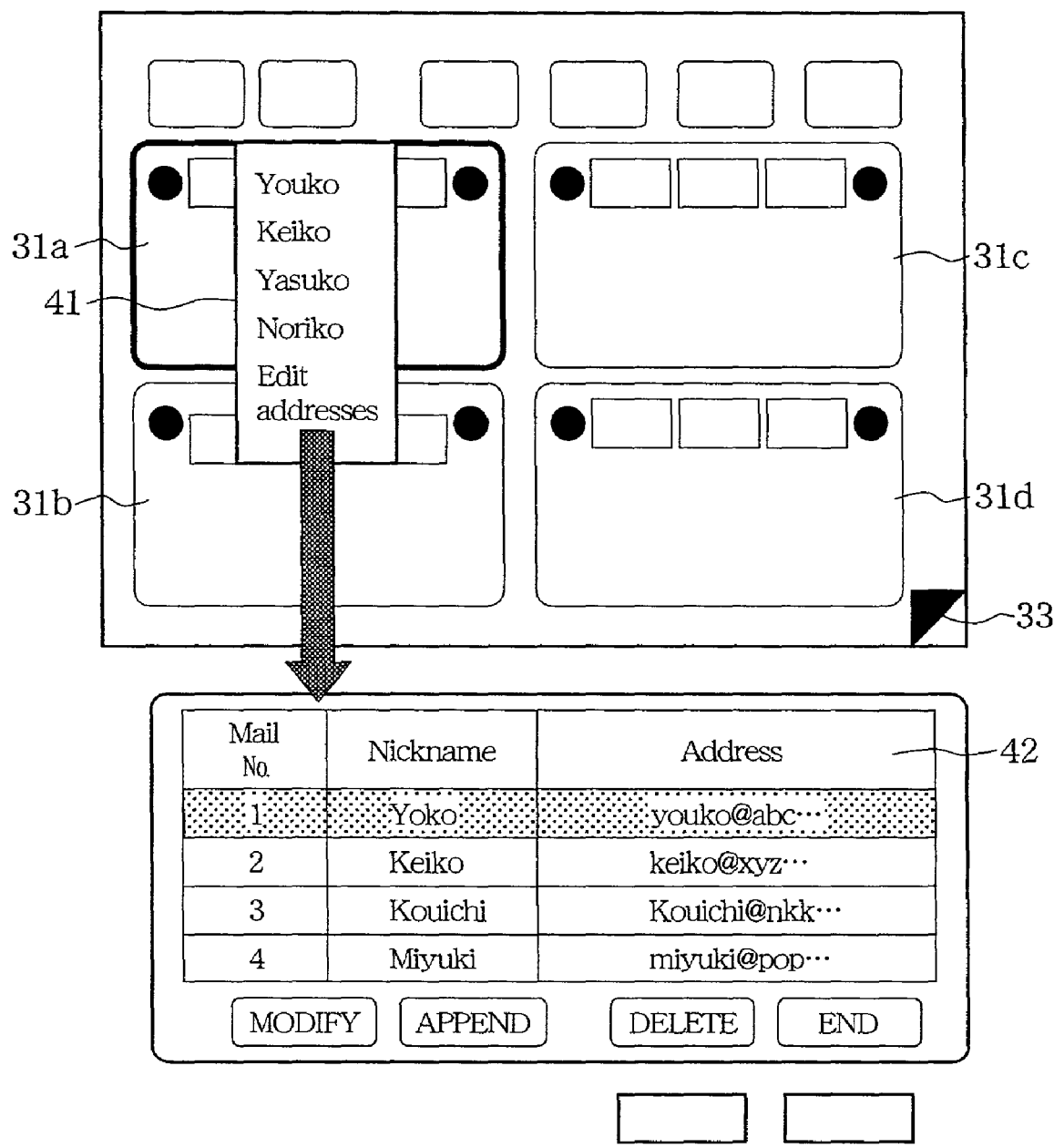
FIG. 9 is a figure which explains the method of setting the destination of electronic mail in the electronic mail transmission/reception system of this aspect.
Figure 10:
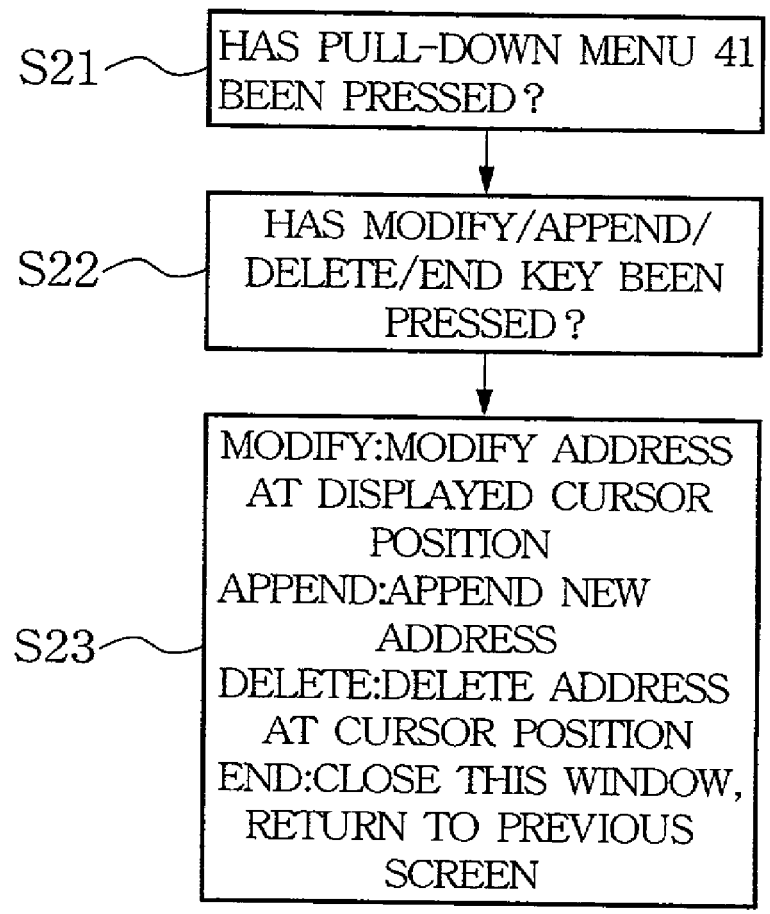
FIG. 10 is a flowchart showing the method of setting the destination of electronic mail in the electronic mail transmission/reception system of this aspect.

FIG. 9 is a figure which explains the method of setting the destination of electronic mail. FIG. 10 is a flowchart showing the method of setting the destination of electronic mail.

As shown in FIG. 9, the method of setting the destination for electronic mail involves, first, touching the mail destination area 34 (FIG. 7), to display the pull-down menu 41 on the screen. At the bottom of this pull-down menu 41, "Edit addresses" is displayed; by selecting this "Edit addresses", the editing window 42 is displayed.

As shown in FIG. 10, in the flow of setting electronic mail destinations, a check is performed in step S21 to determine whether the pull-down menu 41 has been pressed; in step S22, a check is performed to determine whether the repair, append, delete, or end key of the edit window 42 has been pressed. In step S23, a judgment as to which key was pressed is made; if the "repair" key is pressed, the address displayed at the cursor position is modified (edited). If "append" is selected, a new address is appended. If "delete" is selected, the address at the cursor position is deleted. If "end" is selected, the edit window 42 is closed, and the previous screen is again displayed.

Using the above technology, when transmitting electronic mail it is possible to perform processing to open an electronic mail transmission window; processing to input electronic mail text; processing to open an address specification window and select an address; processing to perform actual electronic mail transmission; and similar, without being conscious of each of these processing tasks. In particular, if timer transmission/reception is used to transmit and receive input messages automatically, even electronic mail novices can transmit electronic mail in the manner of writing a memo, without performing complex operations.

If a configuration like that in FIG. 6 is used, messages can be captured automatically, with the sensation of using stationery, while working, studying, or similar. Further, messages can be automatically captured even while in motion in a train or car, so that it is possible to concentrate on driving.

Next, the electronic mail transmission/reception system of a third aspect of this invention is explained, referring to the drawings. The hardware configuration of information equipment in which the electronic mail transmission/reception system of this third aspect is adopted is similar to that of FIG. 1.

Below, the operation of an electronic mail transmission/reception system configured as described above is explained.

FIG. 11 is a figure showing examples of display screens of the application message board in the electronic mail transmission/reception system of the third aspect of this invention. This figure is used to explain technology in which a specified region of the display screen is shared.

A message transmitted from equipment A is received by equipment B. Messages are displayed in the same corresponding positions (pages) on the message board in equipment A and equipment B. Electronic mail transmitted and received between them comprises the message display position, and control information which records past electronic mail exchanges. Based on this control information, messages can be displayed in the same positions. That is, the screen layout of equipment B, shown in FIG. 11C, is displayed at the same position "1" as the screen layout of the equipment A, shown in FIG. 11B.

In the equipment B, by causing the display frame of the area in which a newly received message is displayed to flash, or by similar processing, the user can be alerted to the arrival of a new message.

Figure 11A:
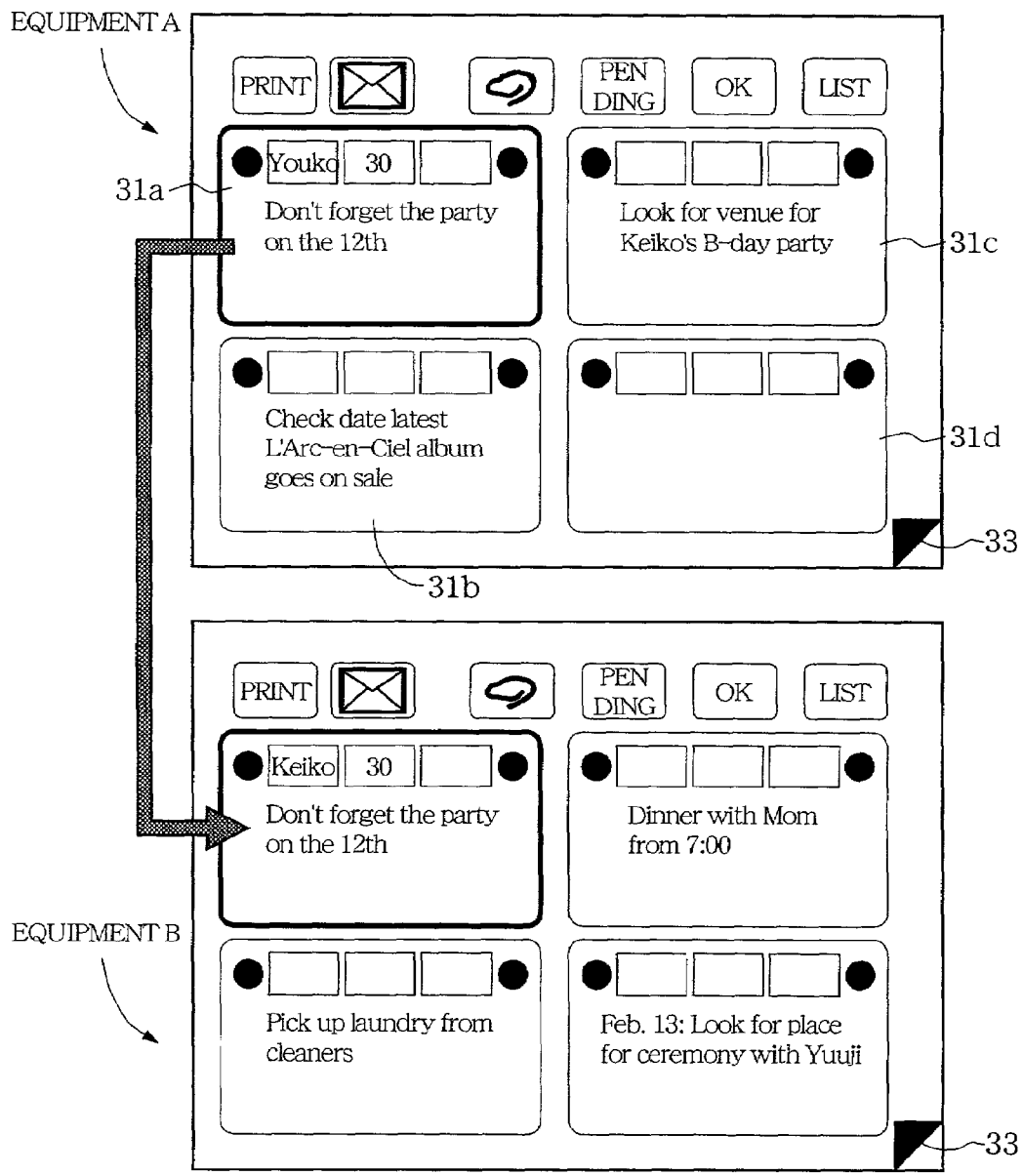
FIGS. 11A to 11C are figures showing examples of screens of the application message board of the electronic mail transmission/reception system of a third aspect of this invention, and (d) through (f) are examples of the layout of the display region.
Figure 11B:
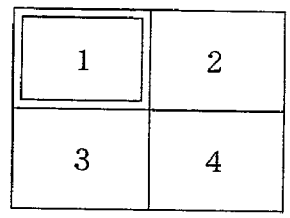
Figure 11C:
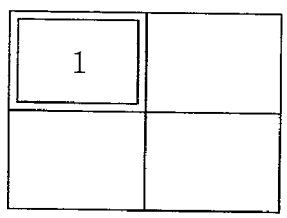
Figure 11D:
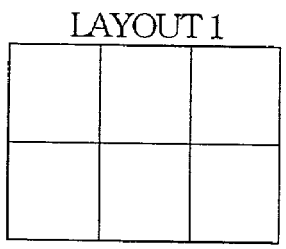
Figure 11E:
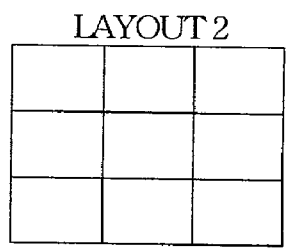
Figure 11F:
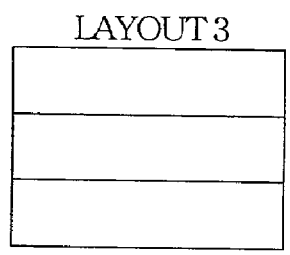

As shown in FIGS. 11D to 11F, the display screen layout can be set according to the size of the screen of the information equipment employed and the preferences of the user.

FIG. 12 is a flowchart showing the operation for sharing a particular region of the display screen. This is explained in terms of processing between the equipment (PDA) A and equipment (PDA) B.

First, in step S31, equipment A transmits electronic mail containing a registered message. The message sent from equipment A is received by equipment B (step S32). In step S33, control information within the message is recognized, and the message display position and past history information are identified. In step S34, the message is displayed in the specified position. Electronic mail transmitted and received between the two comprises message display positions, and control information which records past electronic mail exchanges. Based on this control information, the message is displayed in the same position.

As shown in FIG. 11A, the message is displayed in the same position (page) of the message board. Next, in step S35 the display frame of the message display area in which is displayed a newly received message is flashed, alerting the user to the arrival of a new message.

Here, operation upon the arrival of electronic mail from equipment X, other than equipment A, B, such that the message is to be displayed in the same position, is explained referring to the flow of FIG. 13.

FIG. 13 is a flowchart showing the operation for a case in which electronic mail arrives, such that a message is displayed in the same position, from equipment X, other than the equipment A, B.

First, in step S41, equipment X other than equipment A, B transmits electronic mail the message of which is registered. The message transmitted from equipment X is received by equipment B (step S42). In step S43, control information within the message is recognized, and the message display position and past history information are identified. In step S44, when electronic mail such that the message is to be displayed at the same position has arrived from equipment X other than equipment A, B, the recipient is notified of this. In step S45, the user is prompted to select whether to change the display position, or to display the message in a new position. Next, in step S46 the display frame of the message display area in which the newly received message is displayed is flashed, notifying the user of the arrival of a new message. The message display position can also be changed to an arbitrary display position.

In this way, the same information is provided to the users of both equipment A and equipment B via the electronic mail transmission/reception system. Also, because the message is displayed in the same message display area, the users of equipment A and equipment B can intuitively understand, for example, from which friend the message has arrived.

Next, the electronic mail transmission/reception system of a fourth aspect of this invention is explained, referring to the drawings.

The hardware configuration of the information equipment to which the electronic mail transmission/reception system of this fourth aspect is applied is similar to that of FIG. 1.

Below, the operation of an electronic mail transmission/reception system configured as described above is explained.

Figure 14:
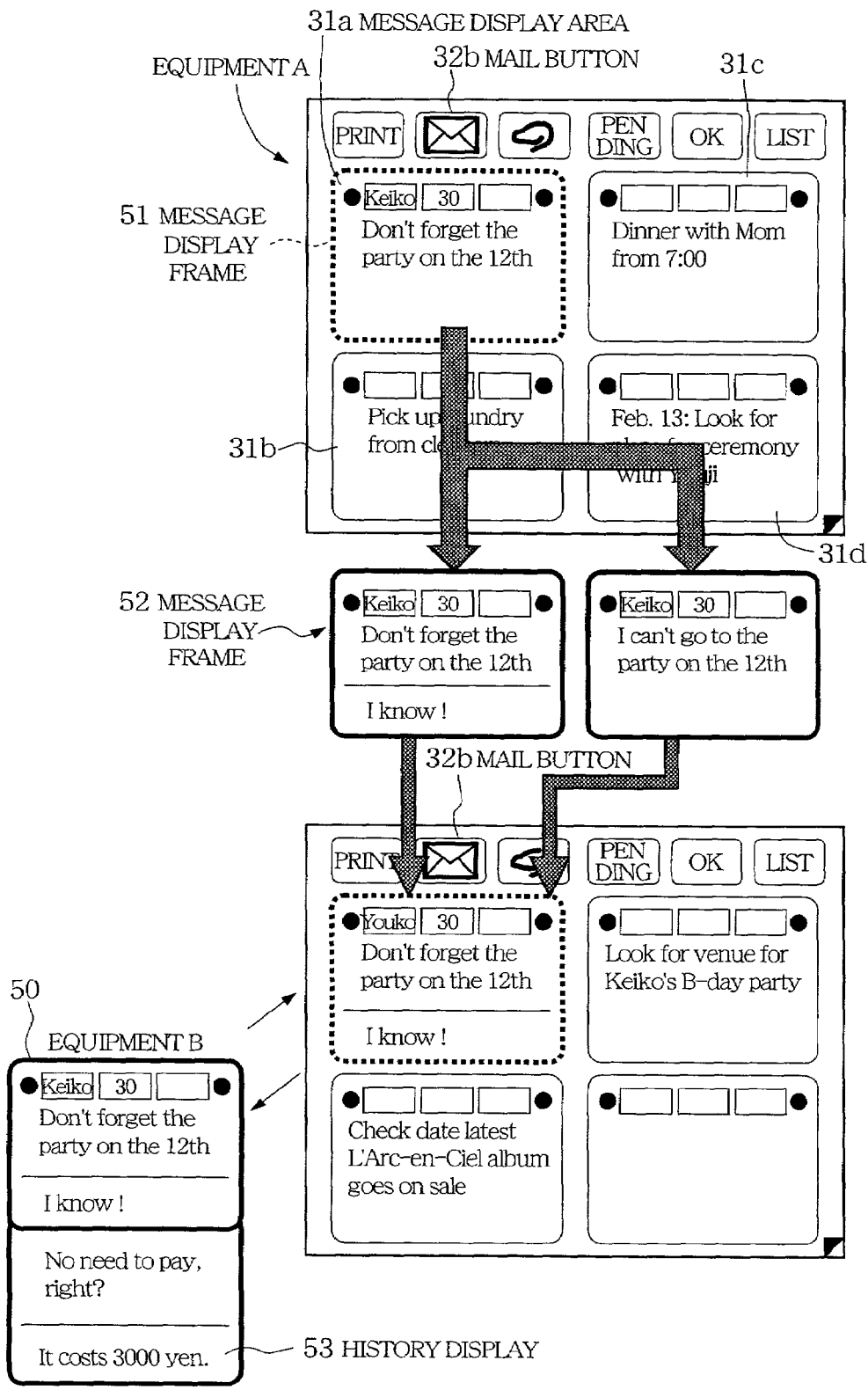
FIG. 14 is a figure which shows one example of the screen of the application message board of the electronic mail transmission/reception system of a fourth aspect of this invention.
Figure 15:
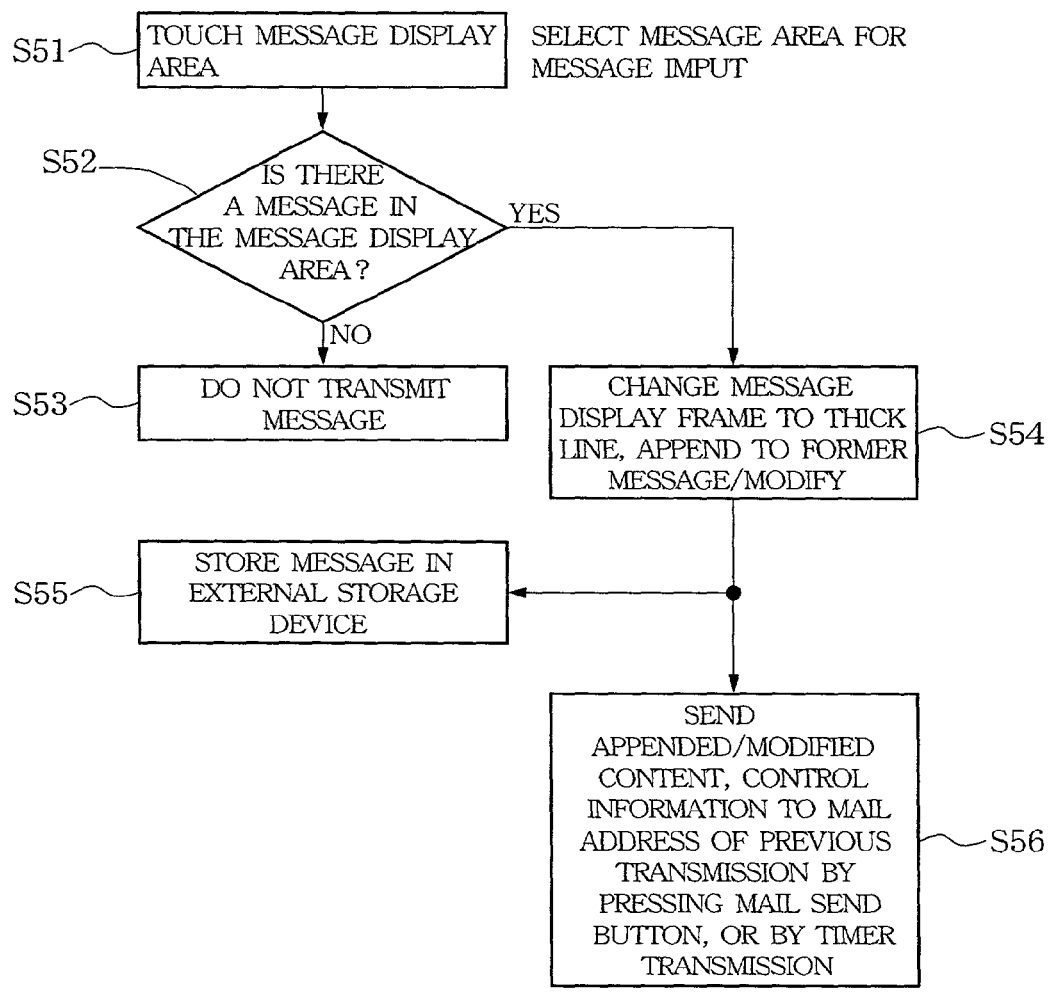
FIG. 15 is a flowchart showing the operation in the case in which message content is modified or appended, when sharing a specific region in an electronic mail transmission/reception system of this aspect.

FIG. 14 shows one example of the screen of the application message board of this electronic mail transmission/reception system, showing a screen example for the case in which modification and appending is performed, when a particular region is shared. FIG. 15 is a flowchart showing the operation in the case in which message content is modified or appended, when sharing a specific region.

When a message is received by the equipment (PDA) A shown in FIG. 14, on touching the message display area 31a in step S51, a character input cursor is displayed, and a new message can be input in succession to the message which has arrived. In step S52, discrimination is performed as to whether there is a message in the message display area; if there is no message in the message display area, in step S53 message transmission is not performed.

If there is a message in the message display area, in step S54 the message display frame 51 changes from flashing to a thick line, as indicated by the arrows (FIG. 14). By changing the message display frame 51 from flashing to a thick line, the user can be notified of the fact that the user is inputting a message into this message display area, and message appending or modification is possible. When input is ended, in step S55 the message is registered in the storage media 27 (or in an external storage device or similar), and in step S56, the appended or modified content and control information are transmitted to the electronic mail address of the previous transmission by either pressing the electronic mail button 32b, or by means of timer transmission.

Here, by either of the operations of again pressing the electronic mail button 32b or of timer-based automatic transmission/reception, the message can be sent to equipment A.

When the equipment B receives this electronic mail, by flashing the display frame of the area in which the newly received message is displayed, the user is notified that a new message has arrived. The item indicated by the symbol 50 is the appended or modified content of a message displayed in a message display area of the equipment B. Within the region of the thick lines, by using the scroll keys or other keys to move the display pointer, the past history of electronic mail can be viewed, as in the history display 53.

In equipment B, not only can new messages be transmitted, but transmitted messages can also be modified. In this case, the modified content is transmitted to the equipment A. If the transmitted message is a schedule, the region for the arrived message is specified and the schedule function of the application is selected to paste in the content. If the address book is used, it becomes possible to register telephone numbers and to make effective utilization in other ways.

Next, the electronic mail transmission/reception system of a variation this aspect is explained, referring to FIG. 16. FIG. 16 is a figure showing an example of the switched screen of an input screen. In this variation, there is an enlarged display setting function.

Figure 16A:
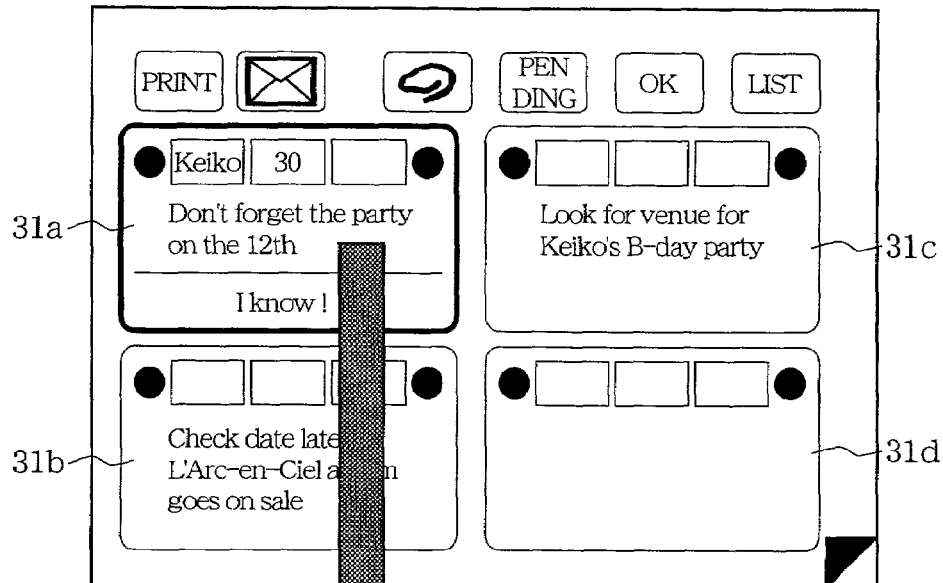
FIGS. 16A and 16B are figures showing an example of the switched screen of an input screen in the electronic mail transmission/reception system of this aspect.
Figure 16B:
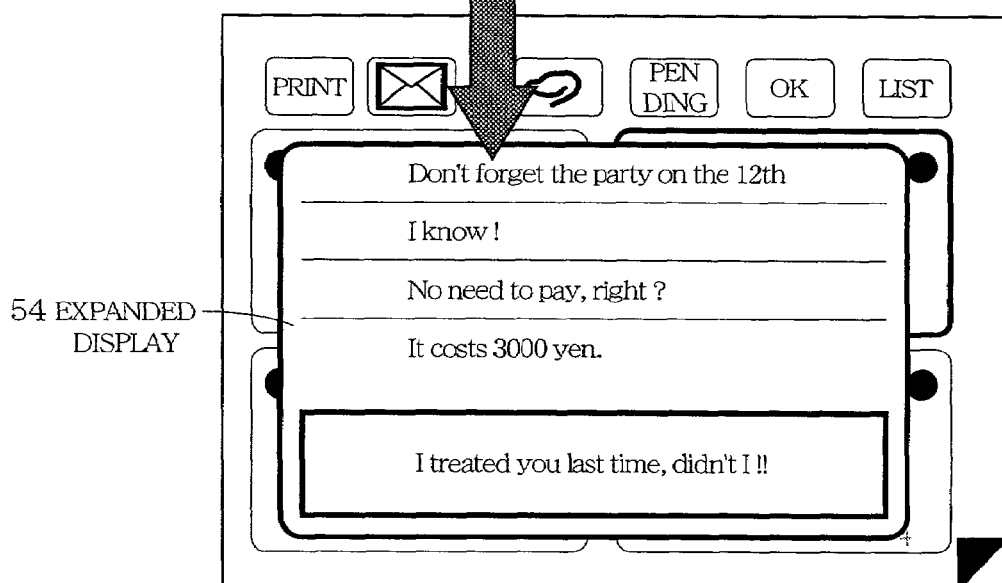

When, in the current layout, the display is small and difficult to view, and the user desires a large screen, the screen can be expanded by means of an expanded display setting function, as shown in FIG. 16A. As shown in FIG. 16B, a large screen can be displayed when a message display area is touched. In FIG. 16B, the message display area 31a is displayed using the expanded display 54, and is easier to view. This expanded display screen can be returned to the original size by touching the screen below the expanded display screen. This is especially useful in the case of a portable telephone or similar, when the display screen is relatively small or when messages are being exchanged with numerous persons.

Next, the electronic mail transmission/reception system of a fifth aspect of this invention is explained, referring to the drawings.

The hardware configuration of information equipment in which the electronic mail transmission/reception system of this fifth aspect is adopted is similar to that of FIG. 1.

Below, the operation of an electronic mail transmission/reception system configured as described above is explained.

Figure 17A:
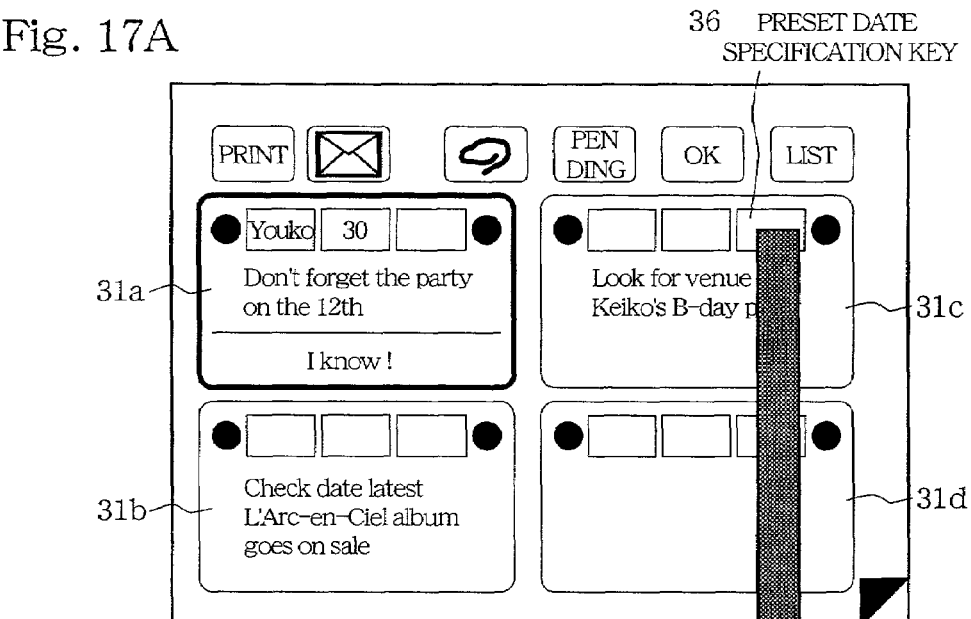
FIGS. 17A and 17B are figures showing examples of screens of the application message board of the electronic mail transmission/reception system of a fifth aspect of this invention.
Figure 17B:
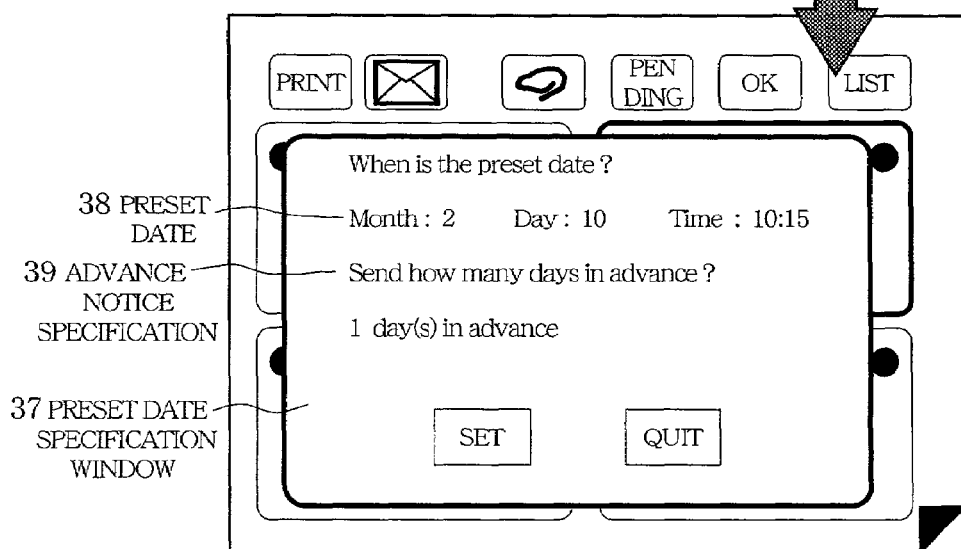
Figure 18A:
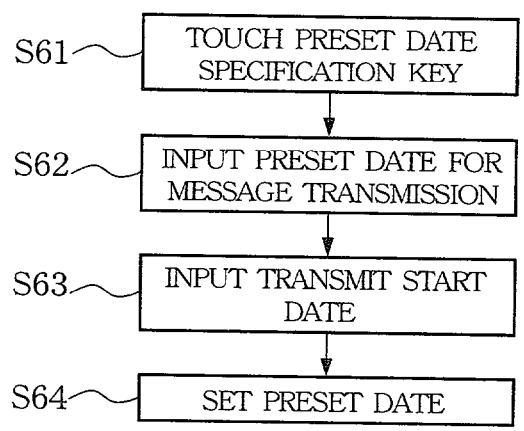
FIGS. 18A and 18B are flowcharts showing the operation to send to oneself a message by specifying a preset date in the electronic mail transmission/reception system of this aspect.

FIG. 17 shows examples of screens of the application message board of this electronic mail transmission/reception system, and shows examples of display screens when messages are transmitted and received by means of a preset data specification function in the message information. FIG. 18 is a flowchart showing the operation to send to oneself a message by specifying a preset date.

By adding a preset date specification function to the message board functions as described above, messages can be sent to oneself to serve as reminders.

As shown in FIG. 17A, a preset date specification key 36 is provided in the message display area. By touching the preset date specification key 36 with for example a stylus pen, a preset date specification window 37 is displayed. A transmission preset date 38 specifying when the message is to be sent, and advance notice transmission specification 39, which specifies that advance notice transmission be performed, can be set.

Information that one is prone to forget is recorded in message form, and in step S61 the preset date specification key 36 is touched to display the preset date specification window 37. In step S62, the transmission preset date 38 for message transmission is specified. Then, in step S63 the transmission start date is input, and in step S64 the preset date is set.

Figure 18B:
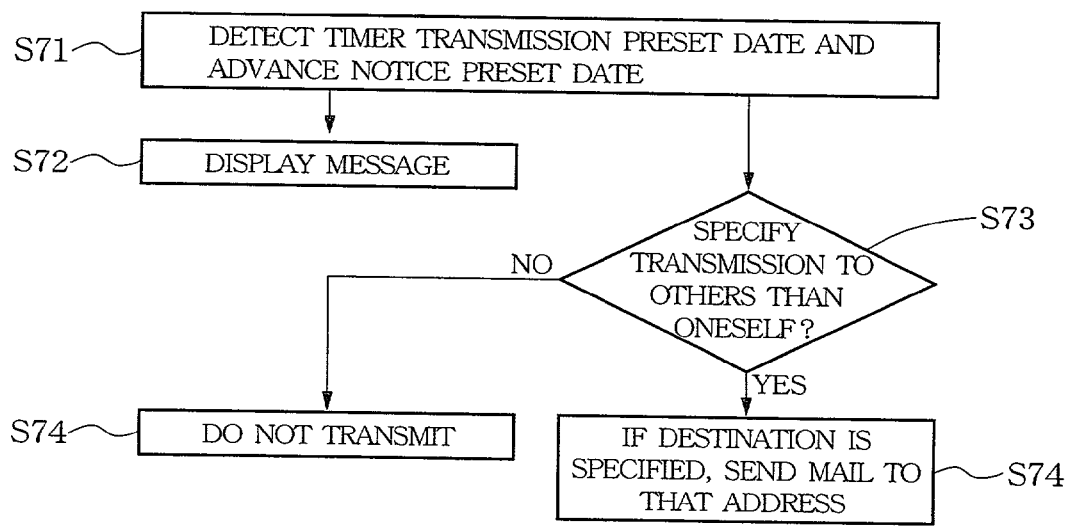

Message transmission processing on the specified transmission preset date and advance notice transmission date is explained below, referring to in FIG. 18B.

First, in step S71 the timer function of the timer control unit 23 is used to detect the specified transmission preset date and advance notice transmission date. When the specified preset date arrives, in step S72 the message is displayed on the display unit 12 (FIG. 1). Also, in step S73 discrimination is performed as to whether the message is specified for transmission to destinations other than oneself. If a destination other than oneself is specified, in step S74 the same message is transmitted to that address. If there is no specification of destinations other than oneself, no transmission is performed, as indicated in step S75.

Through the above processing, one's own reminders can also be utilized by friends and acquaintances. That is, by using the electronic mail transmission/reception system of this aspect, a unified reminder system can be formed which unifies one's own reminders with the reminders of other persons related to these reminders.

Next, the electronic mail transmission/reception system of a sixth aspect of this invention is explained.

Prior to explaining the sixth aspect, deliberations in the course of the invention are explained. In a display screen with a message-board format, by setting the other party with whom electronic mail is exchanged in display regions divided in the manner of a bulletin board enabling listings, when transmitting and receiving electronic mail, the message screen of the other party set in advance is always opened (displayed). As a result, there is no need to perform operations to input the other party each time. There is no need to input the address of the other party with whom one frequently exchanges electronic mail, nor is there the possibility that one may forget an address and be unable to transmit electronic mail.

Further, if the display region of another party with whom one has previously exchanged electronic mail is saved without modification, it is possible to create the next electronic mail message and send and receive electronic mail, while preserving continuity with the history of previous electronic mail exchanges. In other words, electronic mail processing can be resumed without being concerned about other-party settings or similar.

If the message display region of the other party is in use, by giving priority to the position of the message display region over the page number, smoother mutual communication is possible.

Also, if information relating to the positions of message display regions is managed by the electronic mail server, the addition of functions to data terminals can be held to a minimum. The electronic mail server performs unified management of messages. Through use of this server, management of message display regions can be performed simply.

Based on the above deliberations, the electronic mail transmission/reception system of a sixth aspect of this invention is explained, referring to FIG. 1 and to FIGS. 19 through 28.

The electronic mail transmission/reception system of this aspect has a configuration similar to that of the system shown in FIG. 1.

Figure 19A:
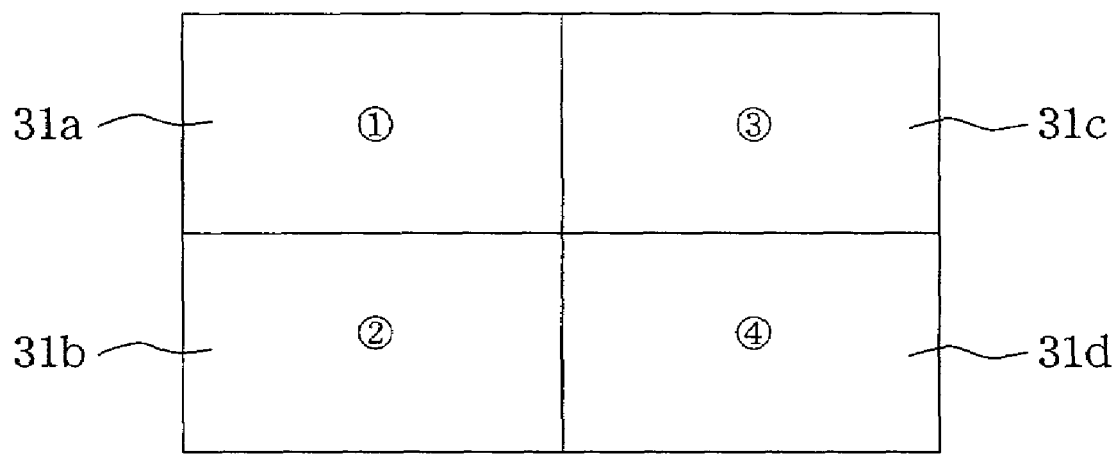
FIGS. 19A and 19B are figures showing the display patterns "A" and "B" in a mail transmission/reception system.
Figure 19B:
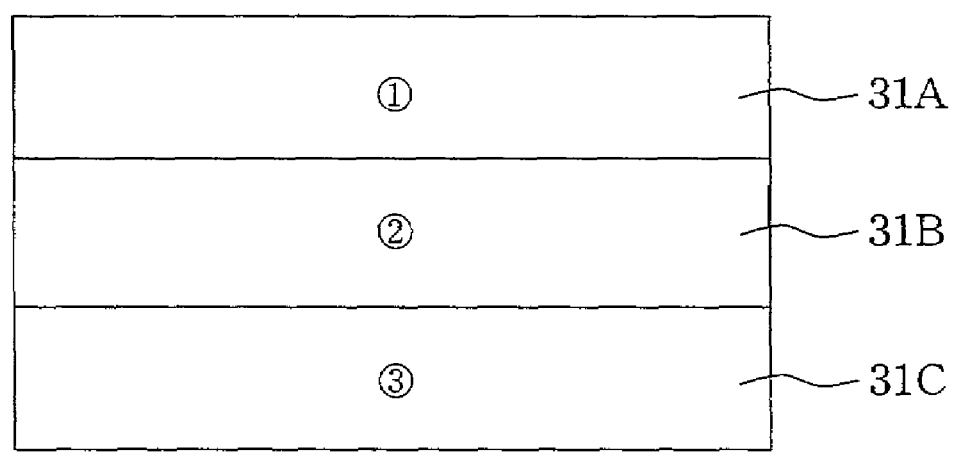

FIG. 19 shows examples of display patterns in a display region. In FIG. 19A, the region is divided in two both vertically and horizontally, for a total of four regions (1) through (4) (31a to 31d). A display pattern divided in this way will hereafter be referred to as display pattern "A". In FIG. 19B, the region is divided into three regions (1) to (3) (31A to 31C) which are continuous in the horizontal region. A display pattern divided in this way will hereafter be referred to as display pattern "B". Apart from this, division into various display patterns such as shown in FIG. 11 is possible; in what follows, however, explanations will be given only for two types of display pattern, the above-described "A" pattern and "B" pattern.

FIG. 20 is an example of the configuration of the data of other connected parties stored in a connected other-party data management storage unit, and is a data management table relating to a plurality of PDAs 10 connected to a mail server 201. As shown in FIG. 20, connected other-party data, including electronic mail numbers, other connected parties, and data on display patterns, display regions, and connection start time, is managed by the mail server 201.

FIG. 21 is a data management table of the connected other-party data management storage unit of one's own PDA 10-1. The numbers entered in parentheses ( ) in the mail no. column corresponding to the mail numbers in FIG. 20.

The details are explained more specifically below, referring to FIGS. 22 through 24. As shown in FIG. 20, in electronic mail no. 1, an electronic mail address ABC@ . . . and an electronic mail address XYZ@ . . . have been exchanging messages from 10:10 on Oct. 1, 2001, in the display area 31a of display pattern "A". As shown in the figure, the display region is page 1-1 for both parties. Of the display "page 1-1", the former numeral denotes the display region, and the latter numeral denotes the page number of the display screen.

In electronic mail no. 2, message exchange began between electronic mail address 123@ . . . and electronic mail address XYZ@ . . . from 10:15 on Oct. 1, 2001. Here, the display pattern for electronic mail address XYZ@ . . . is "A". The display area ① 31a for electronic mail address XYZ@ . . . (in FIG. 19A) is already used for electronic mail no. 1. The next display area is empty, so the display area is taken to be ② 31b, and the display region is page 2-1. The electronic mail address 123@ . . . also has the display pattern "A", and the display area ② 31b is empty, so the display area is taken to be ② 31b, and the display region to be page 2-1.

Next, in electronic mail No. 3, message exchanges began between electronic mail address 123@ . . . and electronic mail address AAA@ . . . at 10:20 on Oct. 1, 2001. Here, the display pattern for both is "A", and the display area ① 31a is also empty on the side with the electronic mail address 123@ . . . , so that the display area is set to ①. The display region is page 1-1 for both.

Electronic mail No. 4 and electronic mail No. 5 similarly have "A" as the display pattern for both, so that display areas are allocated in order from empty display areas. That is, the display pattern for both is "A", and the display areas ③ 31c, ④ 31d are both empty for the side with electronic mail address 123@ . . . and for electronic mail addresses BBB@ . . . and CCC@ . . . , so that the display areas are set to ③ and ④ respectively. The display regions are respectively page 3-1 and page 4-1.

Figure 22:
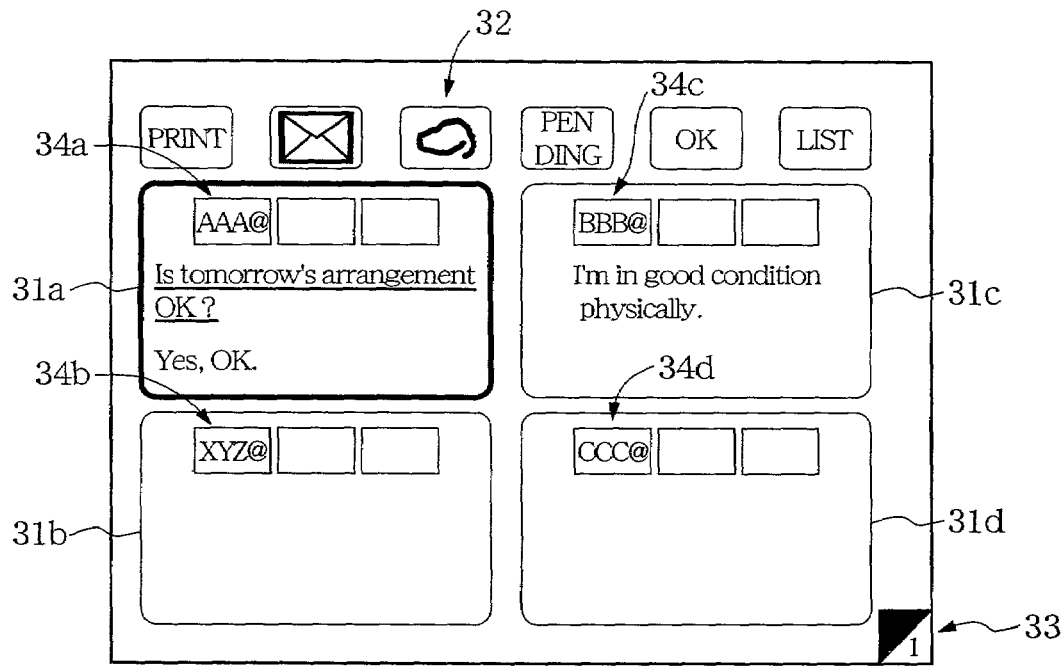
FIG. 22 is a first example of a display screen of the electronic mail transmission/reception system of this aspect.

FIG. 22 is an example of a display screen for electronic mail address 123@ . . . in this case; this screen is discussed below.

In electronic mail No. 6, message exchanges began between electronic mail address 123@ . . . and electronic mail address DDD@ . . . from 10:35 on Oct. 1, 2001. Here also, the display pattern is "A", but all four display areas on the first page are being used. The display area is therefore automatically switched to the second page. All the display areas on the second page are empty, and so the display region is page 1-2 for both.

In electronic mail No. 7, message exchanges began between electronic mail address 123@ . . . and electronic mail address EEE@ . . . from 10:40 on Oct. 1, 2001. The display pattern for electronic mail address 123@ . . . is "A", but the display pattern for electronic mail address EEE@ . . . is "B". The display area ② for electronic mail address 123@ . . . is empty, and so the display region becomes page 2-2. On the other hand, the display pattern for electronic mail address EEE@ . . . is "B", and all display areas are empty, and so the display region becomes page 2-1, in keeping with the display area for electronic mail address 123@ . . .

In electronic mail No. 8, message exchanges began between electronic mail address XYZ@ . . . and electronic mail address EEE@ . . . from 10:45 on Oct. 1, 2001. The display pattern for electronic mail address XYZ@ . . . is "A", but the display pattern for electronic mail address EEE@ . . . is "B". Because the display area ③ of electronic mail address XYZ@ . . . is empty, the display region becomes page 3-1. On the other hand, the display pattern for electronic mail address EEE@ . . . is "B", and the display region becomes page 3-1, in keeping with the display area for electronic mail address XYZ@ . . . .

In electronic mail No. 9, message exchanges began between electronic mail address ABC@ . . . and electronic mail address EEE@ . . . from 10:50 on Oct. 1, 2001. The display pattern for electronic mail address ABC@ . . . is "A", but the display pattern for electronic mail address EEE@ . . . is "B". Because the display area ① on the second page is empty, the display region for electronic mail address ABC@ . . . becomes page 1-2. On the other hand, the display pattern for electronic mail address EEE@ . . . is "B", and the display region becomes page 1-1, in keeping with the display area for electronic mail address ABC@ . . . .

Figure 24:
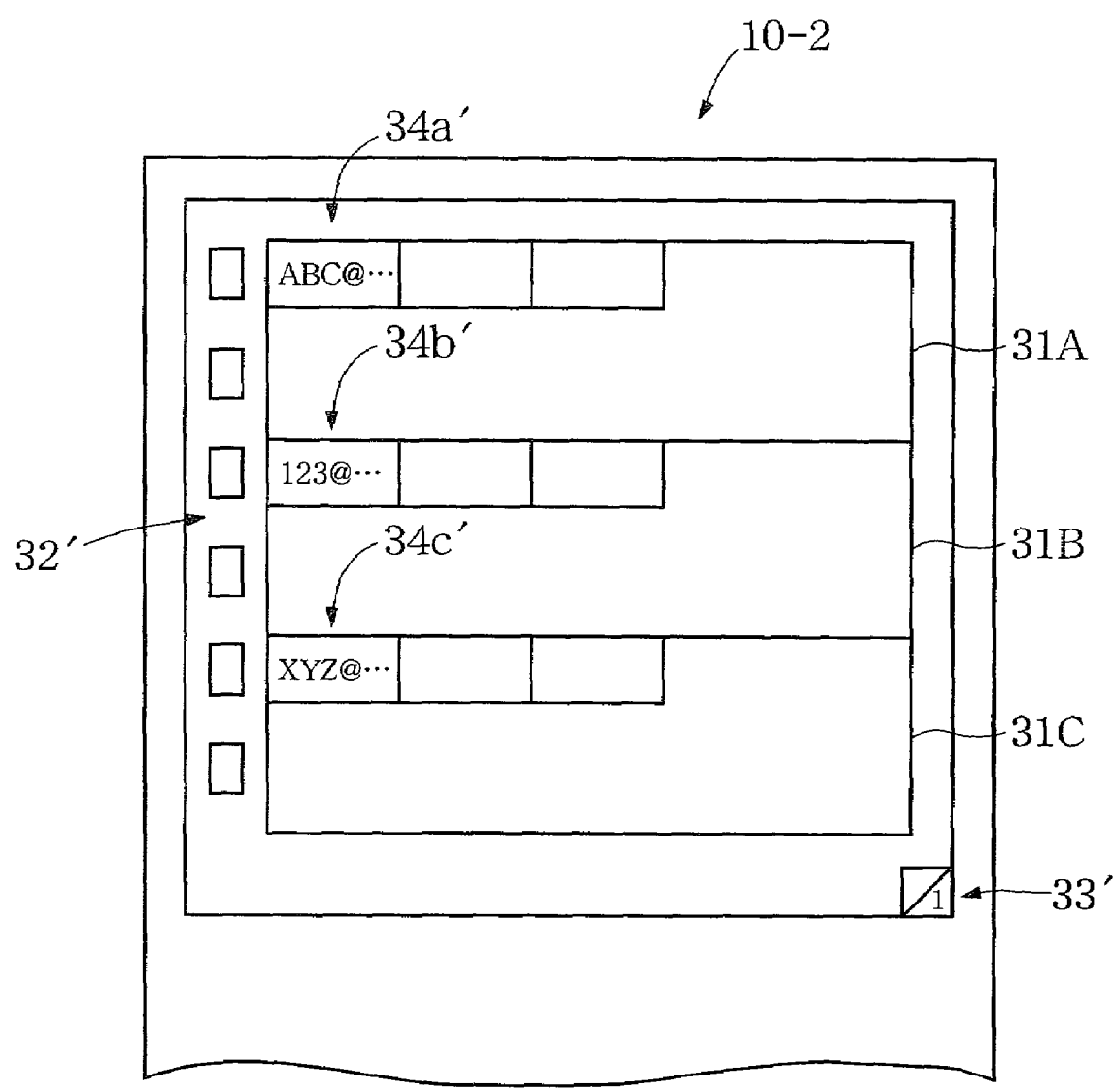
FIG. 24 is a third example of a display screen of the electronic mail transmission/reception system of this aspect.

FIG. 24 is a figure showing an example of a display screen in this case for electronic mail address EEE@ . . . . Here, messages are exchanged using the different display patterns "A" and "B".

Figure 25:
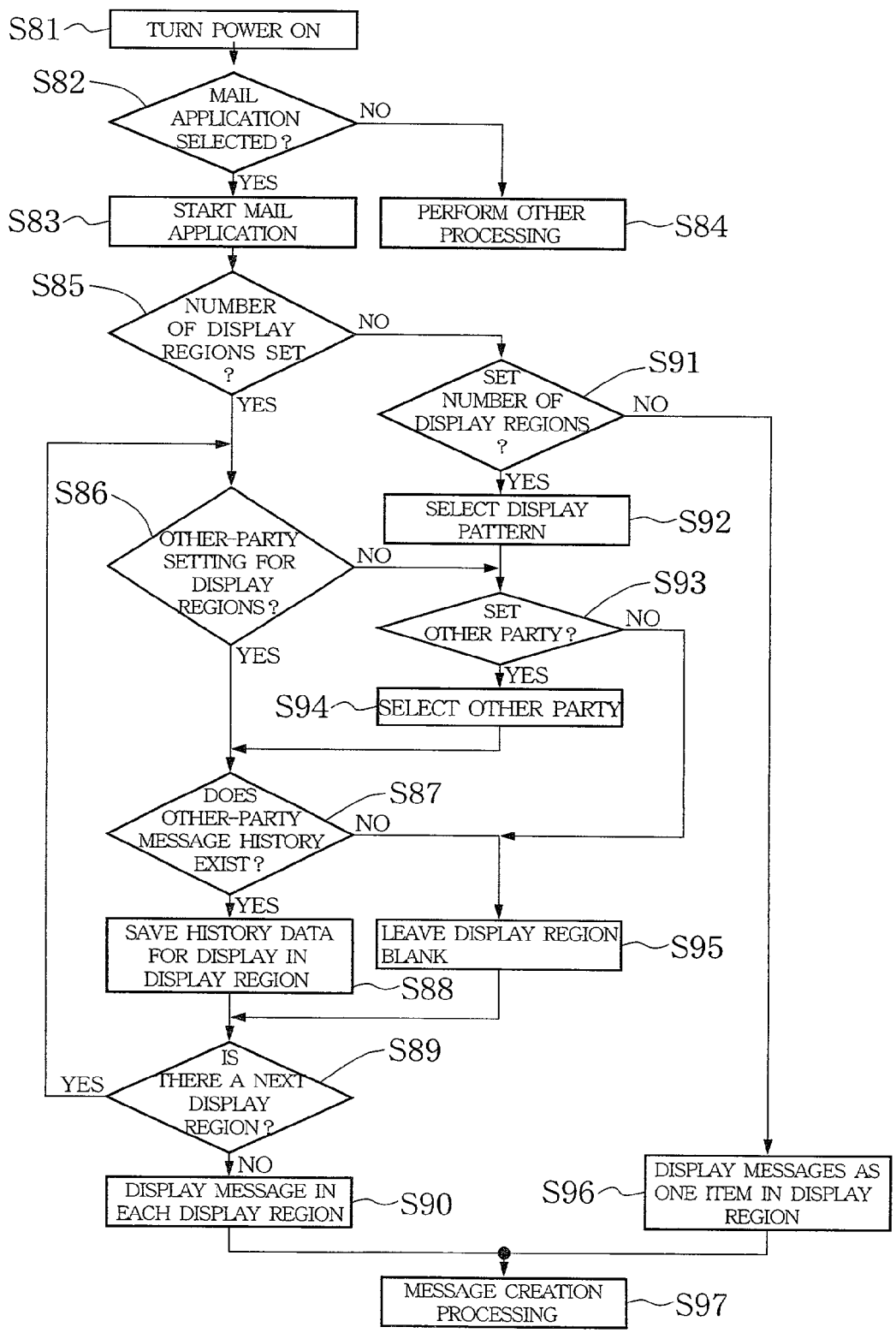
FIG. 25 is a flowchart diagram showing the flow when the power supply of information equipment is turned on and the electronic mail session is started, until the input of a mail message.

FIG. 25 is a flowchart showing the flow when the power supply of the PDA 10 is turned on and electronic mail functions are started, until an electronic mail message is input.

First, in step S81 the power of the PDA 10-1 is turned on, and the application is selected. In step S82, it is judged whether the electronic mail application has been selected. In step S83, if the electronic mail application has been selected, the electronic mail application is started.

In step S82, if an application other than electronic mail has been selected, in step S84 the selected application is started, and other processing is performed.

In step S83, after starting the electronic mail application, processing proceeds to step S85, and it is judged whether the number of display regions has been set. The number of display regions also changes depending on the display pattern. If the number of display regions is set, processing proceeds to step S86, and it is judged whether other-party display regions have been set. In addition, in step S87 it is judged whether there is an other-party message history. In step S87, if there is an other-party message history, this history data is read. In step S88, history data for display in display regions is saved.

In step S87, if there is no message history data, processing proceeds to step S95, and the display area remains blank. Processing proceeds to step S89, and it is judged whether there is a display area for the display pattern of the display region. If a next area exists, processing returns to step S86 to judge whether there exists an other-party setting for the next display area, and the processing from step S86 to step S89 is repeated while there exists a display area to be processed. In step S89, if there are no longer display areas, processing proceeds to step S90 and messages are displayed in each display region.

If in step S85 there is no setting for the number of display regions, processing proceeds to step S91, and a judgment as to whether to set the number of display regions is made. When setting the number of display regions, processing proceeds to step S92, and the display pattern is selected.

After selecting the display pattern, in step S93 a judgment is made as to whether to set other parties for display areas. In step S94, if other party is set, the other party is selected.

Thereafter, processing proceeds to step S87, and other-party historical information is identified. If the other party is not selected, there are no messages to be displayed, and so processing proceeds to step S95, and the display area remains blank. Next processing proceeds to step S89, and it is judged whether a next region exists.

In step S86, if there is no other-party setting for a display area, processing proceeds to step S93, and a judgment is made as to whether the other party is to be set.

In step S91, if the number of display regions is not set, the number of display regions is judged to be 1, and one display region screen is displayed. In this case, it is judged that there is no other-party information set, and the screen is blank. Processing proceeds to step S96, and one message is displayed in the display region.

In step S97, message creation and editing processing is performed for messages displayed in a display region in step S90 and step S96.

FIG. 22 is an example of the display screen when the above processing is performed. The other-party settings (addresses) for the display areas 31a, 31b, 31c, 31d are respectively set to AAA@ . . . , XYZ@ . . . , BBB@ . . . , and CCC@ . . . . In the display area 31a with AAA@ . . . as the other party, the message history "Are the arrangements for tomorrow OK?" and "Yes, OK" is stored; these messages are displayed in display area 31a.

In the next display area, 31b, there is no history data for messages exchanged with the other party XYZ@ . . . , and so a blank area is displayed. In display area 31c for the other party BBB@ . . . , the message history "I'm in good condition physically" is stored, and this message is displayed. In the display area 31d, there is no history data for messages exchanged with CCC@ . . . , and so a blank area is displayed. The second page of the message board is shown in FIG. 23; the message "How are you?" appears in 31a on the second page, and the message "What happened?" appears in 31b on the second page. Because 31c and 31d on the second page currently have no connected other party for messages, they are blank.

Figure 26:
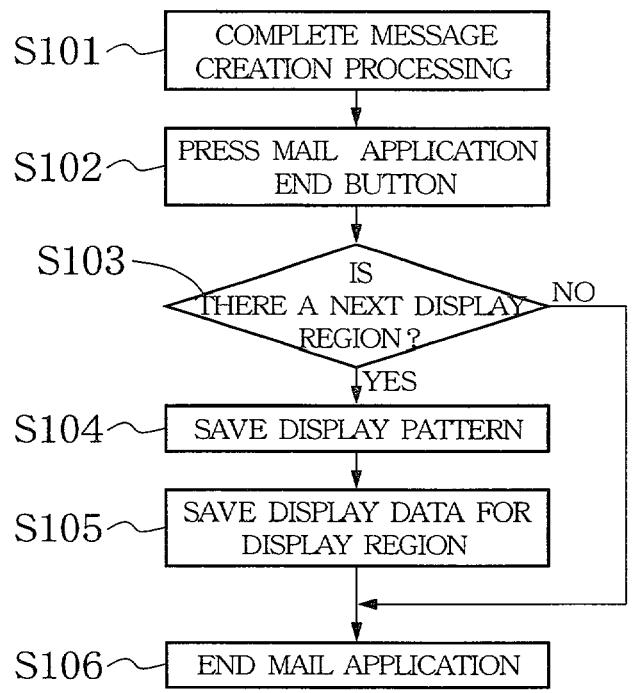
FIG. 26 is a flowchart diagram showing the flow of processing when the electronic mail session ends.
Figure 27:
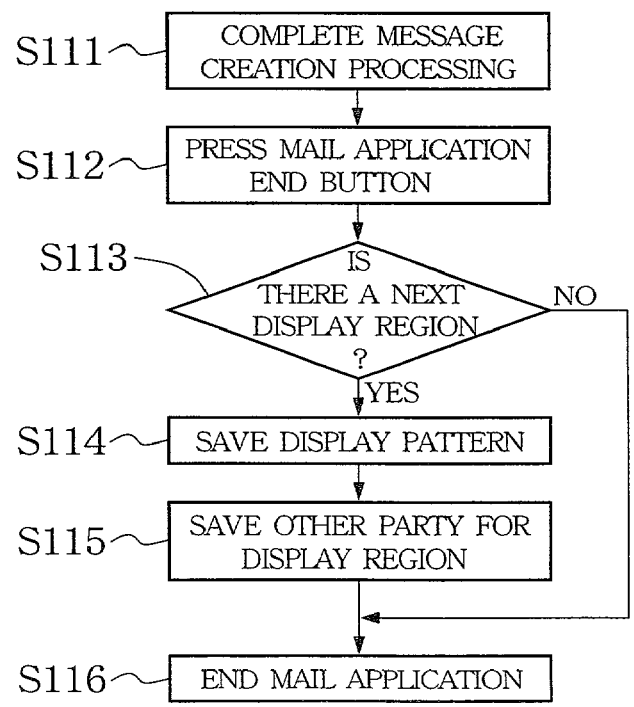
FIG. 27 is a flowchart diagram showing the flow of processing when the electronic mail session ends.

Next, processing when ending an electronic mail session is explained, referring to FIG. 26 and FIG. 27. FIG. 26 is a flowchart for the case in which the display content of messages exchanged in electronic mail are stored, without modification, when the electronic mail session is ended. In this method, when resuming electronic mail processing, the message content is displayed as it was when the previous processing ended. This is explained below.

First, when electronic mail message exchange is to be concluded, in step S101 electronic mail (message) creation and editing tasks are ended. Then, in step S102 and end button which indicates the end of electronic mail processing is pressed. In step S103, a judgment is made as to whether display areas of the display screen at this time are displayed. If display areas are displayed, in step S104 the display pattern of the display area is stored in the message display region storage unit 26-3 in RAM 26. In step S105, messages and other display content displayed in message areas is stored in the message storage unit 26-2 in RAM 26. In step S106, electronic mail processing is ended. If, in step S103, display areas are not displayed, processing proceeds to step S106, and electronic mail processing is ended.

FIG. 27 is a flowchart showing processing of the display content of messages exchanged in electronic mail processing, when other-party information is stored at the end of an electronic mail session. In this method, when resuming electronic mail processing, message content is read from other-party information at the time processing is ended, and is displayed.

First, in step S111 message creation and editing tasks are ended, in order to end electronic mail message exchange. Then, in step S112 and end button which indicates the end of electronic mail processing is pressed. In step S113, a judgment is made as to whether display areas of the display screen are displayed at this time. If, in step S113, display areas are displayed, in step S114 the display pattern of the display areas is saved in RAM 26, and in step S115 the other-party information of the display areas is saved in RAM 26. In step S116, electronic mail processing is ended.

In step S113, if display areas are not displayed, processing proceeds to step S116, and electronic mail processing is ended.

Figure 28:
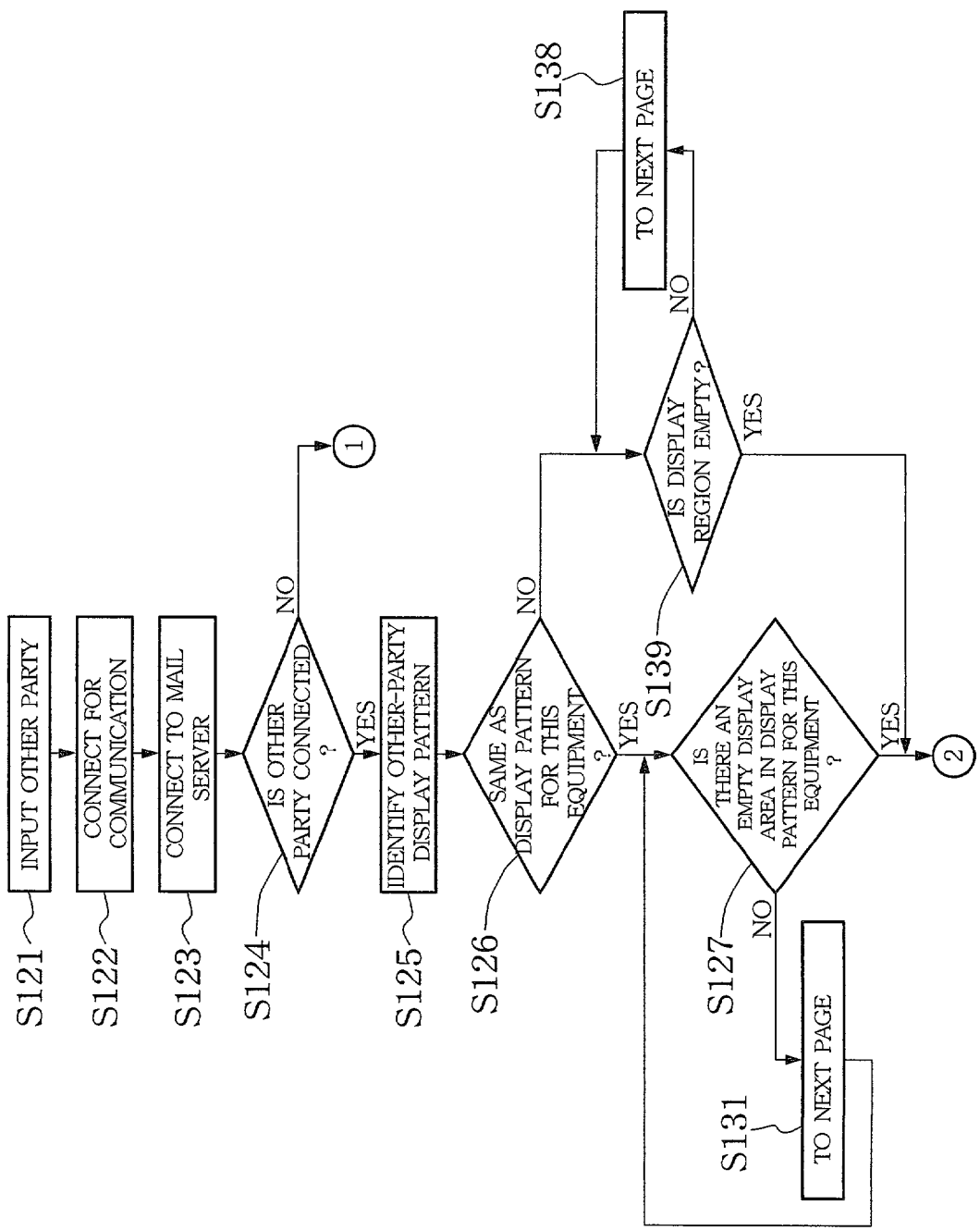
FIG. 28 is a flowchart diagram showing the flow when information equipment is connected to the electronic mail network, and the display area for input of a mail message is determined; and, FIG. 29 is a flowchart diagram showing, with FIG. 28, the flow when information equipment is connected to the electronic mail network, and the display area for input of a mail message is determined.
Figure 29:
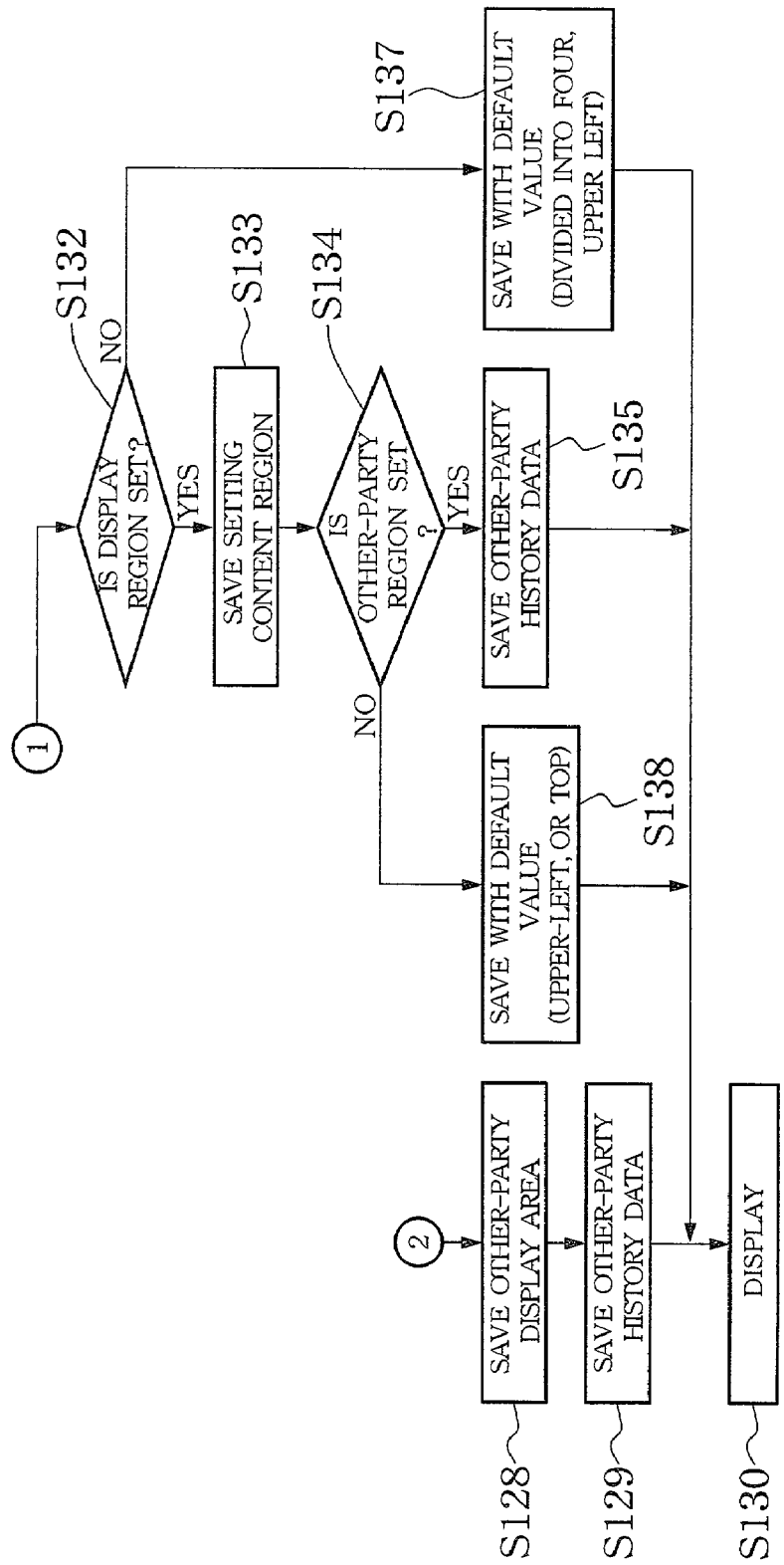

FIG. 28 and FIG. 29 are flowcharts showing the flow of electronic mail processing to connect a PDA 10 to a mail server 201 and determine a display area for input of electronic mail messages.

First, in step S121 the address, nickname or similar of another party with whom electronic mail is to be exchanged is input. Then, in step S122, telephone lines or similar are used to connect the PDA 10 to the network 200, and in step S123, the PDA 10 is connected to the mail server 201.

In step S124, it is determined whether the other party is connected, referring to the content of the connected other-party data management storage unit 202 of the mail server 201. In step S124, if it is judged that the other party is connected, processing proceeds to step S125, the display pattern for the other party is identified, and in step S126, a judgment is made as to whether this is the same as the display pattern for one's own PDA 10. If in step S126 the display patterns are judged to be the same, processing proceeds to step S127, and it is determined whether there is an empty display area in the display pattern for the local device. If there is an empty display area, processing proceeds to step S128, and the other-party display area is saved. Processing then proceeds to step S129, and the other-party historical data is saved. Then, in step S130 the screen is displayed. If in step S127 there is no empty area in the local device, processing proceeds to step S131, and pages are turned until an empty area appears.

In step S126, if it is judged that the display patterns are different, processing proceeds to step S139, and it is determined whether an empty display area exists on the same page. If there is no empty area in step S139, in step S138 the display region advances to the next page. When a page on which there is an empty area appears, processing proceeds to step S128. The above processing is repeated until an empty display area appears.

If in step S124 the other party is not connected, in step S132 it is determined whether the display pattern is set in one's own PDA 10-1. If in step S132 no display pattern has been set, processing proceeds to step S133, the region of the display pattern setting contents is saved, and in step S134, it is determined whether the other party is set in this display pattern. If in step S134 the other party is set, in step S135 historical data for messages exchanged with the other party is read and saved. If in step S134 the other party is not set, processing proceeds to step S138, and the default value for one's own PDA 10-1 is set (in this equipment, the other-party display area is set either on the upper-left, or on the top).

If in step S132 there is no display pattern setting, processing proceeds to step S137, and the setting content is saved as a display area in the display pattern which is the default value for one's own PDA 10-1 (in this equipment, the default value is set to a screen divided into four areas).

The other-party historical data saved in step S135, and the default value saved in step S137 or step S138, are displayed on the display unit in step S130.

Figure 23:
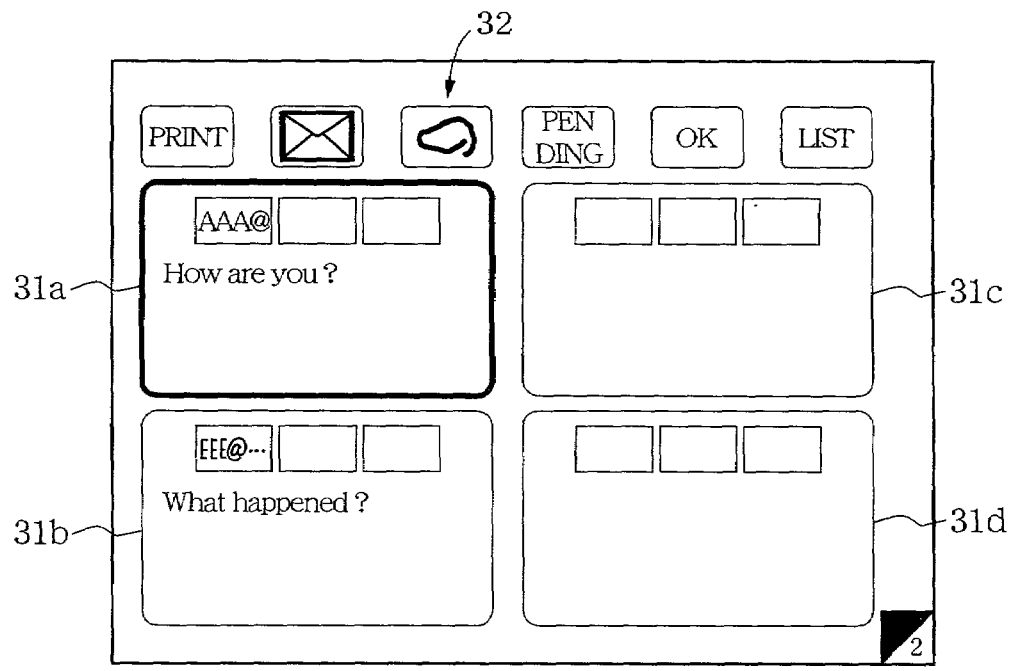
FIG. 23 is a second example of a display screen of the electronic mail transmission/reception system of this aspect.

Examples of display screens resulting from the above processing are as explained through the referenced FIG. 22 to FIG. 24.

In the electronic mail system of this aspect, information can be exchanged with friends and acquaintances without being conscious of electronic mail functions, and communication with a group is possible in a bulletin-board manner, differing from simple electronic mail functions, in which a plurality of messages can be listed.

Also, by setting the other party with whom mail is exchanged in display regions divided similarly to a bulletin board enabling listings, the message screen of the other party, set in advance, can always be opened when mail is to be exchanged. Hence the operation of inputting the other-party address each time can be omitted, so that operation becomes simple, and the possibility of forgetting the name of the other party with whom one is exchanging mail can be prevented.

Further, the display region of the other party with whom one had been exchanging mail previously is stored without modification, and when mail exchange is again performed, mail exchange with the other party can be continued; mail exchange can be resumed without being concerned about the settings for the other party or similar matters.

Also, if the display region for messages of the other party is in use, by giving priority to the position of the message display region, so that the position is the same as for the other party, communications can be streamlined.

By managing position information for message display regions at the mail server, the need to add hardware and software functions to data terminals can be reduced. The fact that message management is performed by the mail server of the electronic mail transmission/reception system can be utilized to easily manage message display regions.

In addition to application of the electronic mail transmission/reception systems of each of the above aspects in portable data terminals and other information equipment, application in any other device, so long as it is capable of transmitting and receiving electronic mail (for example, portable mobile terminals or pagers), is possible. Moreover, data types are not limited to characters.

In these aspects, the appellation "electronic mail transmission/reception system" has been used; this was used for convenience in explanations, and this system may of course be an electronic mail processing device, receiving device, or similar.

The electronic mail transmission/reception system of these aspects may be incorporated as data communication functions in a PDA or other portable data terminal or a personal computer.

Further, the types of components comprised by the above electronic mail transmission/reception system, types of memory, method of division of the message display regions of display screens, and similar are not limited to those of the above-described aspects.

The electronic mail transmission/reception systems explained above may also be realized by programs which effect the functions of such a processing device. This program may be stored on computer-readable recording media. In the electronic mail transmission/reception system of these aspects, the main memory itself may be the program media, used as the recording media; or, a program reading device may be provided as an external storage device, such that by inserting the recording media, the program can be read. In all cases, the stored program may be configured for access and execution by a CPU; or, in all cases, the program may be read, and the read program downloaded to a program storage area, not shown in figures, so that the program is executed. This program for downloading is stored in advance in a main device.

The above program media comprises a main unit and separable recording media; for example, in addition to PC cards (SRAM cards), this may be media which holds the program in fixed form, such as floppy disks, hard disks and other magnetic disks; CD-ROM, MO, MD, DVD, and other optical disc systems; IC cards (including memory cards), optical cards, and other card systems; and mask ROM, EPROM, EEPROM, flash ROM, and other semiconductor memory.

Further, in these aspects the system is configured as connectable to a communication network, including the Internet; hence media holding a program dynamically, as in the case of programs downloaded from a communication network, may be used. When downloading a program from a communication network in this way, the program for downloading may be either stored in advance in the main unit device, or installed from separate recording media. Moreover, the content stored on recording media is not limited to a program, but may also be data.

In the above, this invention has been explained using aspects as examples; but the present invention is not limited to these aspects. It will be evident to a practitioner of the art that various other modifications, improvements, and combinations are possible.

By means of this invention, information can be exchanged with friends and acquaintances without being aware of electronic mail functions, and communication in the manner of a bulletin board enabling lists of a plurality of messages, differing from simple electronic mail functions, is possible.

What is claimed is:

1. An electronic mail transmission/reception system, comprising:
   a communication means, to transmit and receive electronic mail;
   a display means, to display transmitted and received electronic mail on a display screen;
   a message input means, to input messages to said display screen;
   a message storage means, to store said input messages; and,
   a control means, to cause said display means to display said input messages in a message-board format; and wherein
   said control means divides said display screen into a plurality of message display regions, and associates each message with a message display region for display, and wherein each of said message display regions has an other-party specification region to specify the other party to which to transmit messages, and comprises a specification means to specify another party from one or a plurality of other parties set in said other-party specification region; and, said control means performs control to transmit a message displayed in said message display region to the other party specified by said specification means.

2. The electronic mail transmission/reception system according to claim 1, wherein display position information, indicating in which message display region a message has been displayed, is attached to transmitted electronic mail, and said control means displays a received message in the message display region in question, based on said display position information attached to the received message.

3. The electronic mail transmission/reception system according to claim 1, wherein, when a message arrives from another party, said control means displays the received message in said message display region, and performs control to change the displayed state of the message display region.

4. The electronic mail transmission/reception system according to claim 1, wherein time information, to perform message transmission at a time set in advance, is attached to transmitted and received electronic mail, and based on said time information, said control means transmits the message displayed in said message display region to the other party specified by said specification means when said set time arrives.

5. Computer-readable recording media on which is recorded a program, which causes a computer to execute:
   a procedure to transmit and receive electronic mail;
   a procedure to display transmitted and received electronic mail on a display screen;
   a procedure to input messages to said display screen;
   a procedure to store said input messages;
   a procedure to cause said display screen to display said input messages in message-board format, to divide said display screen into a plurality of message display regions each having an other-party specification region to specify the other party to which to transmit messages, and to associate each message with a message display region for display;
   a procedure to specify another party from one or a plurality of other parties set in the other-party specification region; and
   a procedure to perform control to transmit a message displayed in the message display region to the other party specified by the specification procedure.

6. A program, which causes a computer to execute:
   a procedure to transmit and receive electronic mail;
   a procedure to display transmitted and received electronic mail on a display screen;
   a procedure to input messages to said display screen;
   a procedure to store said input messages;
   a procedure to cause said display screen to display said input messages in message-board format, to divide said display screen into a plurality of message display regions each having an other-party specification region to specify the other party to which to transmit messages, and to associate each message with a message display region for display;
   a procedure to specify another party from one or a plurality of other parties set in the other-party specification region; and
   a procedure to perform control to transmit a message displayed in the message display region to the other party specified by the specification procedure.

7. The program according to claim 6, further comprising a procedure to transmit messages displayed in said plurality of message regions in electronic-mail format.

8. An electronic mail transmission/reception system, having:
   a communication means, to transmit and receive data, including electronic mail;
   a display means, having a display screen;
   a message input means, to input messages displayed on said display screen;
   a storage means, to associate and store the data of said transmitted or received electronic mail and the data of said input messages;
   a display region division means, to divide said display screen into a plurality of message display regions; and,
   a control means, which causes the data of said electronic mail and the data of said messages, associated and stored in said storage means, to be displayed in said message display regions, and causes said communication means to perform transmission and reception according to prescribed user operations,
   wherein each of said message display regions has an other-party specification region to specify the other party to which to transmit messages, and comprises a specification means to specify another party from one or a plurality of other parties set in said other-party specification region; and, said control means performs control to cause said communication means to transmit a message displayed in said message display region to the other party specified by said specification means.

9. The electronic mail transmission/reception system according to claim 8, further comprising an other-party setting means to set the other party corresponding to said divided message display regions; and wherein said electronic mail data and said message data are associated with a preset other party by said other-party setting means.

10. The electronic mail transmission/reception system according to claim 8, wherein, when a received message is displayed in said message display region based on display position information attached to the received message, if said message display region in which the message is to be displayed is already in use, said control means switches the display screen, giving priority to the display position of said message display region, and displays said received message in said message display region.

11. The electronic mail transmission/reception system according to claims 8, wherein said prescribed user operation is an operation to start electronic mail processing.

12. The electronic mail transmission/reception system according to claims 9, wherein said messages input into each of said message display regions are displayed in association with other parties set by said other-party setting means.

13. The electronic mail transmission/reception system according to claims 8, wherein said storage means comprises a storage region, which stores said message display regions at the time the previous electronic mail session is ended, in association with the data content displayed in the message region.

14. The electronic mail transmission/reception system according to claim 13, further comprising an other-party setting content saving means which saves the other party corresponding to said message display regions when the previous electronic mail session is ended, and wherein, when starting electronic mail processing, a message which had been stored in said storage region, and which was displayed in a message display region based on the other party of said message display region used at the time of ending of the previous session, is again displayed.

15. The electronic mail transmission/reception system according to claims 8, further having an electronic mail server on the network, which has a management means for the unified management of information as to in which of said message display region said transmitted electronic mail has been displayed.

16. Computer-readable recording media on which is recorded a program, which causes a computer to execute:
   a procedure to transmit and receive data, including electronic mail;
   a procedure to input messages;
   a storage procedure, to associate and store data of said transmitted and received electronic mail with data of said messages;
   a procedure to divide said display screen into a plurality of message display regions each having an other-party specification region to specify the other party to which to transmit messages;
   a procedure to cause the display of said electronic mail data and said message data, associated and stored in said storage means, in said message display regions, and to cause said communication means to perform transmission and reception according to prescribed user operations;
   a procedure to specify another party from one or a plurality of other parties set in the other-party specification region; and
   a procedure to perform control to transmit a message displayed in the message display region to the other party specified by the specification procedure.

17. A program, which causes a computer to execute:
   a procedure to transmit and receive data, including electronic mail;
   a procedure to input messages;
   a storage procedure, to associate and store data of said transmitted and received electronic mail with data of said messages;
   a procedure to divide said display screen into a plurality of message display regions each having an other-party specification region to specify the other party to which to transmit messages;
   a procedure to cause the display of said electronic mail data and said message data, associated and stored in said storage means, in said message display regions, and to cause said communication means to perform transmission and reception according to prescribed user operations;
   a procedure to specify another party from one or a plurality of other parties set in the other-party specification region; and
   a procedure to perform control to transmit a message displayed in the message display region to the other party specified by the specification procedure.

18. An electronic mail transmission/reception system, comprising:
   a message input means, to input messages;
   a display means, having a display screen to display said input messages;
   a control means, to divide said display screen into a plurality of message display regions, and to associate said messages with said message display regions; and,
   a communication means, to transmit and receive messages displayed on said display screen in electronic-mail format;
   wherein each of said message display regions has an other-party specification region to specify the other party to which to transmit messages, and comprises a specification means to specify another party from one or a plurality of other parties set in said other-party specification region; and, said control means performs control to transmit a message displayed in said message display region to the other party specified by said specification means.

19. An electronic mail transmission/reception system, comprising:
   a display means, having a display screen;
   a control means, to divide said display screen into a plurality of data display regions;
   a message input means, capable of input of messages related to said plurality of message display regions; and,
   a communication means, to transmit and receive messages displayed in said display regions in electronic-mail format
   wherein each of said message display regions has an other-party specification region to specify the other party to which to transmit messages, and comprises a specification means to specify another party from one or a plurality of other parties set in said other-party specification region; and, said control means performs control to transmit a message displayed in said message display region to the other party specified by said specification means.

20. An electronic mail transmission/reception system, comprising:
    a communication device for transmitting and receiving electronic mail;
    a display for displaying transmitted and received electronic mail on a display screen;
    a message input device for inputting messages to said display screen;
    a message storage device for storing said input messages; and,
    a controller for causing said display to display said input messages in a message-board format; and wherein said controller divides said display screen into a plurality of message display regions each including an other-party specification region to specify an other party to which to transmit messages and a specification device to specify another party from one or a plurality of other parties set in said other-party specification region, said controller associating each message with a message display region for display, said controller performing control to transmit a message displayed in a given message display region to an other party specified in the other party specification region of the given message display region.

* * * * *